US011346751B1

(12) United States Patent
King et al.

(10) Patent No.: US 11,346,751 B1
(45) Date of Patent: May 31, 2022

(54) INTERACTIVE DIAGNOSTICS FOR EVALUATING DESIGNS FOR MEASUREMENT SYSTEMS ANALYSIS

(71) Applicant: SAS Institute Inc., Cary, NC (US)

(72) Inventors: Caleb Bridges King, Cary, NC (US); Joseph Albert Morgan, Raleigh, NC (US); Ryan Adam Lekivetz, Cary, NC (US); Bradley Allen Jones, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/388,519

(22) Filed: Jul. 29, 2021

Related U.S. Application Data

(60) Provisional application No. 63/123,628, filed on Dec. 10, 2020.

(51) Int. Cl.
*G01M 99/00* (2011.01)
*G06N 5/04* (2006.01)

(52) U.S. Cl.
CPC .............. *G01M 99/00* (2013.01); *G06N 5/04* (2013.01)

(58) Field of Classification Search
CPC ................................ G01M 99/00; G06N 5/04
USPC ......................................................... 702/189
See application file for complete search history.

(56) References Cited

U.S. PATENT DOCUMENTS 8,046,090 B2 * 10/2011 MacArthur ............ G05B 17/02
700/32
8,121,818 B2 * 2/2012 Gorinevsky ....... G05B 23/0281
702/183

OTHER PUBLICATIONS

Genta, G. et al., "Study of Measurement Process Capability With Non-Normal Data Distributions", 15th CIRP Conference on Computer Aided Tolerancing—CIRP CAT 2018, vol. 75, Jun. 11, 2018, pp. 385-390, Elsevier.

McNeese, B., "Evaluating the Measurement Process (EMP) Overview", Jul. 1, 2019, pp. 1-12, retrieved on Jul. 29, 2021, retrieved from internet: https://www.spcforexcel.com/Downloads/Evaluating-the-Measurement-Process-(EMP)-Overview.pdf.

Quality-One, "Measurement System Analysis (MSA)", Jan. 1, 2020, pp. 1-7, retrieved on Jun. 10, 2021, retreived from internet: https://quality-one.com/msa/.

(Continued)

*Primary Examiner* — Ricky Go
(74) *Attorney, Agent, or Firm* — Coats & Bennett, PLLC

(57) ABSTRACT

A computing system receives a request for computer-generated likelihood(s) for candidate evaluations of an industrial product set according to a measurement system analysis (MSA). The MSA comprises tests for evaluating, according to a measurement standard, the industrial product set. The request indicates a metric set representing metric(s) each quantifying an estimate of contribution to variation in evaluating the industrial product set according to the MSA. The system generates a design comprising a respective input set for each test of the MSA. The respective input set comprises setting(s) for conducting a test of the MSA. The design is designed to isolate candidate sources for contributing to the variation in evaluating the industrial product set according to the MSA. The system (e.g., prior to the MSA) outputs, based on the metric set and the design, the computer-generated likelihood(s) for the candidate evaluations of the industrial product set according to the MSA.

28 Claims, 30 Drawing Sheets

(56) References Cited

OTHER PUBLICATIONS

McNeese, B., "Evaluating the Measurement Process—Part 2", Jan. 1, 2015, pp. 1-11, retrieved on Jun. 9, 2021, retrieved from internet: https://www.spcforexcel.com/Downloads/pdf/Evaluating-the-Measurement-Process-Part2.pdf.

Minitab 19 Support, "Which Measurement System Analysis are Included in Minitab?", Jan. 1, 2020, pp. 1-2, retrieved on May 20, 2021, retrieved from internet: https://support.minitab.com/en-us/minitab/19/help-and-how-to/quality-and-process-improvement/measurement-system-analysis/supporting-topics/basics/measurement-system-analyses-in-minitab/.

weibull.com, "Issue 153: Measurement Systems Analysis in DOE++", Nov. 1, 2013, pp. 1-5, retrieved on May 20, 2021, retrieved from internet: https://www.weibull.com/hotwire/issue153/hottopics153.htm.

* cited by examiner

EMP Results

| EMP Test | Results | Description |
|---|---|---|
| Test-Retest Error | 0.9321 | Within Error |
| Degrees of Freedom | 240 | Amount of information used to estimate within error |
| Probable Error | 0.6287 | Median error for a single measurement |
| Intraclass Correlation (no bias) | 0.6216 | Proportion of variation attributed to part variation without including bias factors |
| Intraclass Correlation (with bias) | 0.4241 | Proportion of variation attributed to part variation with bias factors |
| Intraclass Correlation (with bias and interactions) | 0.4218 | Proportion of variation attributed to part variation with bias factors and interactions |
| Bias Impact | 0.1975 | Amount by which the bias factors reduce the intraclass correlation |
| Bias and Interaction Impact | 0.1999 | Amount by which the bias factors and interactions reduce the intraclass correlation |

| System | Classification |
|---|---|
| Current (with bias) | Third Class |
| Current (with bias and interactions) | Third Class |
| Potential (no bias) | Second Class |

Monitor Classification Legend

| Classification | Intraclass Correlation | Attenuation of Process Signal | Probability of Warning, Test 1 Only* | Probability of Warning, Tests 1-4* |
|---|---|---|---|---|
| First Class | 0.80 - 1.00 | Less than 11% | 0.99 - 1.00 | 1.00 |
| Second Class | 0.50 - 0.80 | 11% - 29% | 0.88 - 0.99 | 1.00 |
| Third Class | 0.20 - 0.50 | 29% - 55% | 0.40 - 0.88 | 0.92 - 1.00 |
| Fourth Class | 0.00 - 0.20 | More than 55% | 0.03 - 0.40 | 0.08 - 0.92 |

\* Probability of warning for a 3 standard error shift within 10 subgroups using Wheeler's tests, which correspond to Nelson's tests 1, 2, 5, and 6.

Variance Estimates (1732)

| Factor | Variance | 95% CI Lower Bound | 95% CI Upper Bound |
|---|---|---|---|
| Part | 1.5 | 0.4576 | 3.2568 |
| Operator | 2 | 0.0514 | 7.6224 |
| Part*Operator | 0 | 0 | 0 |
| Error | 0.5 | 0.3428 | 0.6891 |

Spec Limit Failure Probability (1738)

| Response Name | Spec Limit Failure Probability | 95% CI Lower Bound | 95% CI Upper Bound |
|---|---|---|---|
| Y | 0.0162* | <.0001* | 0.1402 |

Variance Proportions (1736)

| Factor | Variance Proportion | 95% CI Lower Bound | 95% CI Upper Bound |
|---|---|---|---|
| Part | 37.5% | 10.8% | 78.7% |
| Operator | 50.0% | 2.4% | 82.2% |
| Part*Operator | 0.0% | 0.0% | 0.0% |
| Error | 12.5% | 4.9% | 34.7% |

EMP Monitoring Classification (1734)

| Monitoring Type | Probability of Classification |
|---|---|
| First Class | 1.8% |
| Second Class | 36.0% |
| Third Class | 49.3% |
| Fourth Class | 12.9% |

Variance Estimates (1762)

| Factor | Variance | 95% CI Lower Bound | 95% CI Upper Bound |
|---|---|---|---|
| Part | 1.5 | 0.7382 | 2.6833 |
| Operator | 0.5 | 0.012 | 1.8106 |
| Part*Operator | 0 | 0 | 0 |
| Error | 0.5 | 0.383 | 0.639 |

Spec Limit Failure Probability (1768)

| Response Name | Spec Limit Failure Probability | 95% CI Lower Bound | 95% CI Upper Bound |
|---|---|---|---|
| Y | 0.0015* | <.0001* | 0.0190* |

Variance Proportions (1766)

| Factor | Variance Proportion | 95% CI Lower Bound | 95% CI Upper Bound |
|---|---|---|---|
| Part | 60.0% | 33.9% | 80.8% |
| Operator | 20.0% | 0.6% | 50.3% |
| Part*Operator | 0.0% | 0.0% | 0.0% |
| Error | 20.0% | 11.3% | 35.3% |

EMP Monitoring Classification (1764)

| Monitoring Type | Probability of Classification |
|---|---|
| First Class | 3.3% |
| Second Class | 79.0% |
| Third Class | 17.7% |
| Fourth Class | 0.1% |

*FIG. 17C*

INTERACTIVE DIAGNOSTICS FOR EVALUATING DESIGNS FOR MEASUREMENT SYSTEMS ANALYSIS

CROSS-REFERENCE TO RELATED APPLICATIONS

This application claims the benefit of, and priority based on, 35 U.S.C. § 119 to U.S. Provisional Application No. 63/123,628, filed Dec. 10, 2020, the disclosures of each of which are incorporated herein by reference in their entirety.

BACKGROUND

Industrial products such as mechanical or electrical system components or substrates can be prone to variations when manufacturing large quantities. Variations can be problematic if, for instance, the industrial products should be within certain tolerances such as for safety (e.g., automotive or airplane components) or simply to fit together well (e.g., toy snap together bricks). Variations may come from many sources such as the part itself or the measurement process for measuring the variation. Industrial parts or their measurement process can be classified based on their likelihood of meeting certain measurement standards given possible variations. Classifications or evaluations for industrial products can consider variations that come not only from a product itself, but from the measurement process such as the measurement tools, measurement operators, and measurement techniques. A measurement system analysis (MSA) can be used to evaluate a measurement process. For instance, measurement tests can be designed and executed on a set of industrial parts for an Evaluating the Measurement Process (EMP) classification, which can be used to assess consistency, reproducibility, or repeatability of a measurement system.

SUMMARY

In an example embodiment, a computer-program product tangibly embodied in a non-transitory machine-readable storage medium is provided. The computer-program product includes instructions to cause a computing system to, prior to a measurement system analysis, receive a request for one or more computer-generated likelihoods for respective candidate evaluations of an industrial product set according to the measurement system analysis. The measurement system analysis comprises measurement tests for evaluating, according to a measurement standard, the industrial product set comprising one or more industrial products. Each measurement test of the measurement tests has a respective setting for each member of a factor set comprising one or more factors of the measurement system analysis. The request indicates a metric set representing one or more metrics each quantifying, prior to the measurement system analysis, an estimate of contribution to variation in evaluating the industrial product set according to the measurement system analysis. The computer-program product includes instructions to cause a computing system to, prior to the measurement system analysis, generate an input design comprising a respective input set for each respective measurement test of the measurement system analysis. The respective input set comprises one or more settings for conducting the respective measurement test of the measurement system analysis. The input design is designed to isolate candidate sources for contributing to the variation in evaluating the industrial product set according to the measurement system analysis. The computer-program product includes instructions to cause a computing system to, prior to a measurement system analysis, output, based on the metric set and the input design, the one or more computer-generated likelihoods for the respective candidate evaluations of the industrial product set according to the measurement system analysis.

In another example embodiment, a computing device is provided. The computing device includes, but is not limited to, a processor and memory. The memory contains instructions that when executed by the processor control the computing device to, prior to the measurement system analysis, output, based on the metric set and the input design, the one or more computer-generated likelihoods for the respective candidate evaluations of the industrial product set according to the measurement system analysis.

In another example embodiment, a method is provided of prior to the measurement system analysis, outputting, based on the metric set and the input design, the one or more computer-generated likelihoods for the respective candidate evaluations of the industrial product set according to the measurement system analysis.

Other features and aspects of example embodiments are presented below in the Detailed Description when read in connection with the drawings presented with this application.

BRIEF DESCRIPTION OF THE DRAWINGS

FIGS. 15A-15D illustrate example graphical user interfaces for generating likelihoods for candidate evaluations of an industrial product set according to at least one embodiment of the present technology.

FIGS. 16A-16D illustrate an example comparison of computer-generated likelihoods for candidate evaluations according to a measurement system analysis to an actual evaluation of a measurement system analysis according to at least one embodiment of the present technology.

FIGS. 17A-17C illustrate example graphical user interfaces for changing variance estimates for updating computer-generated likelihoods of respective candidate evaluations according to at least one embodiment of the present technology.

DETAILED DESCRIPTION

In the following description, for the purposes of explanation, specific details are set forth to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
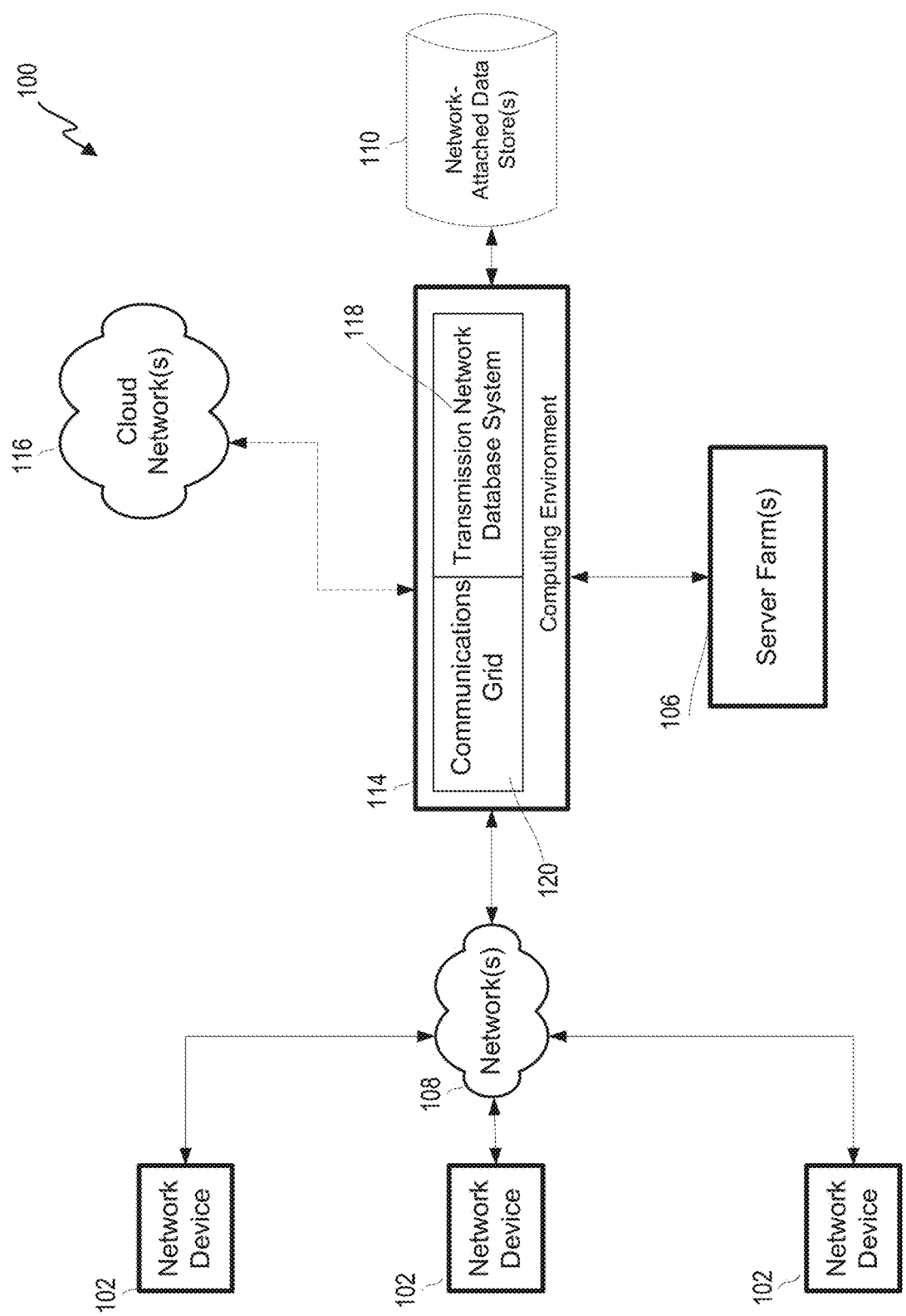
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
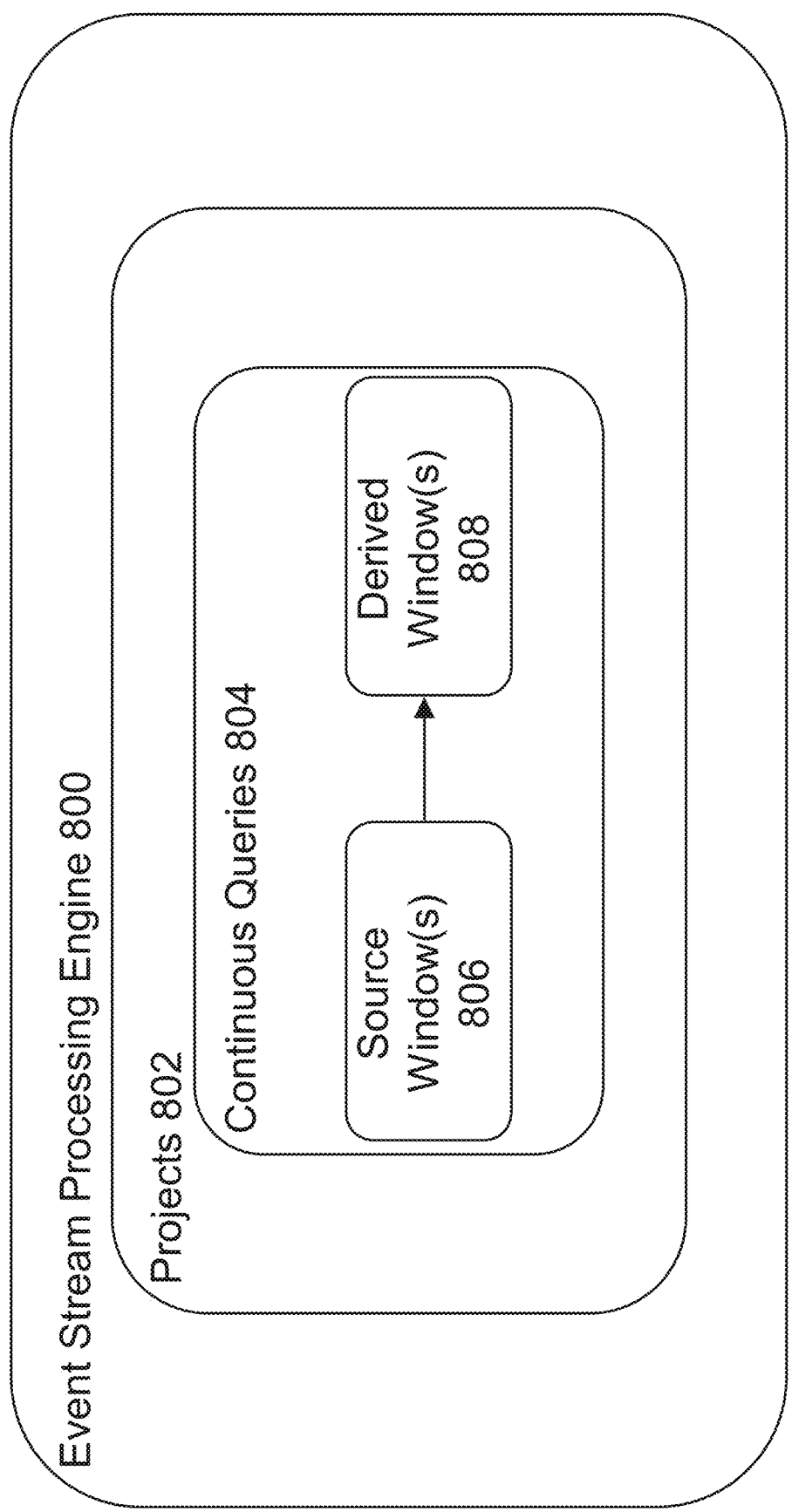
FIG. 8 illustrates a block diagram including components of an Event Stream Processing Engine (ESPE), according to at least one embodiment of the present technology.
Figure 9:
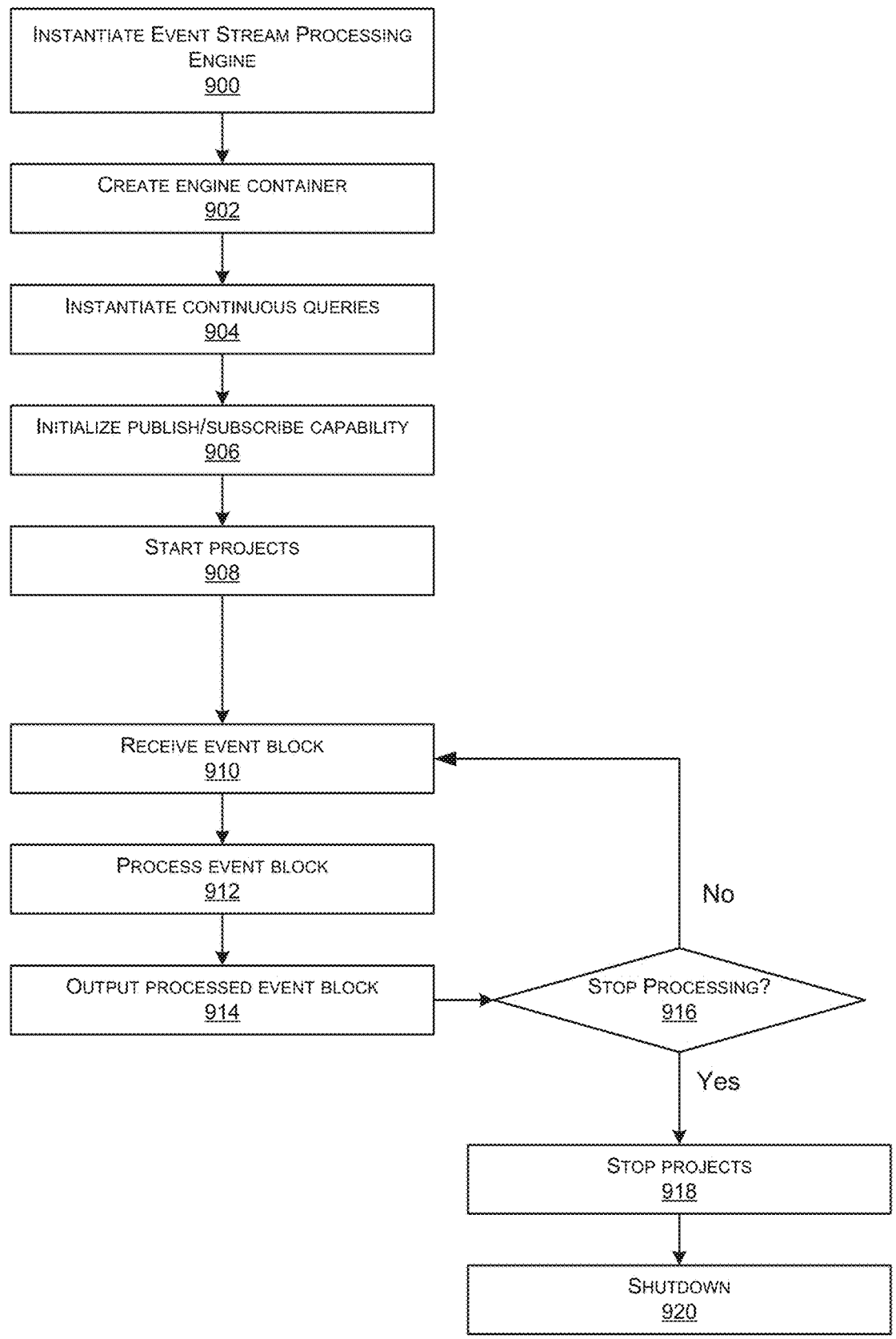
FIG. 9 illustrates a flow chart showing an example process including operations performed by an event stream processing engine, according to at least one embodiment of the present technology.
Figure 10:
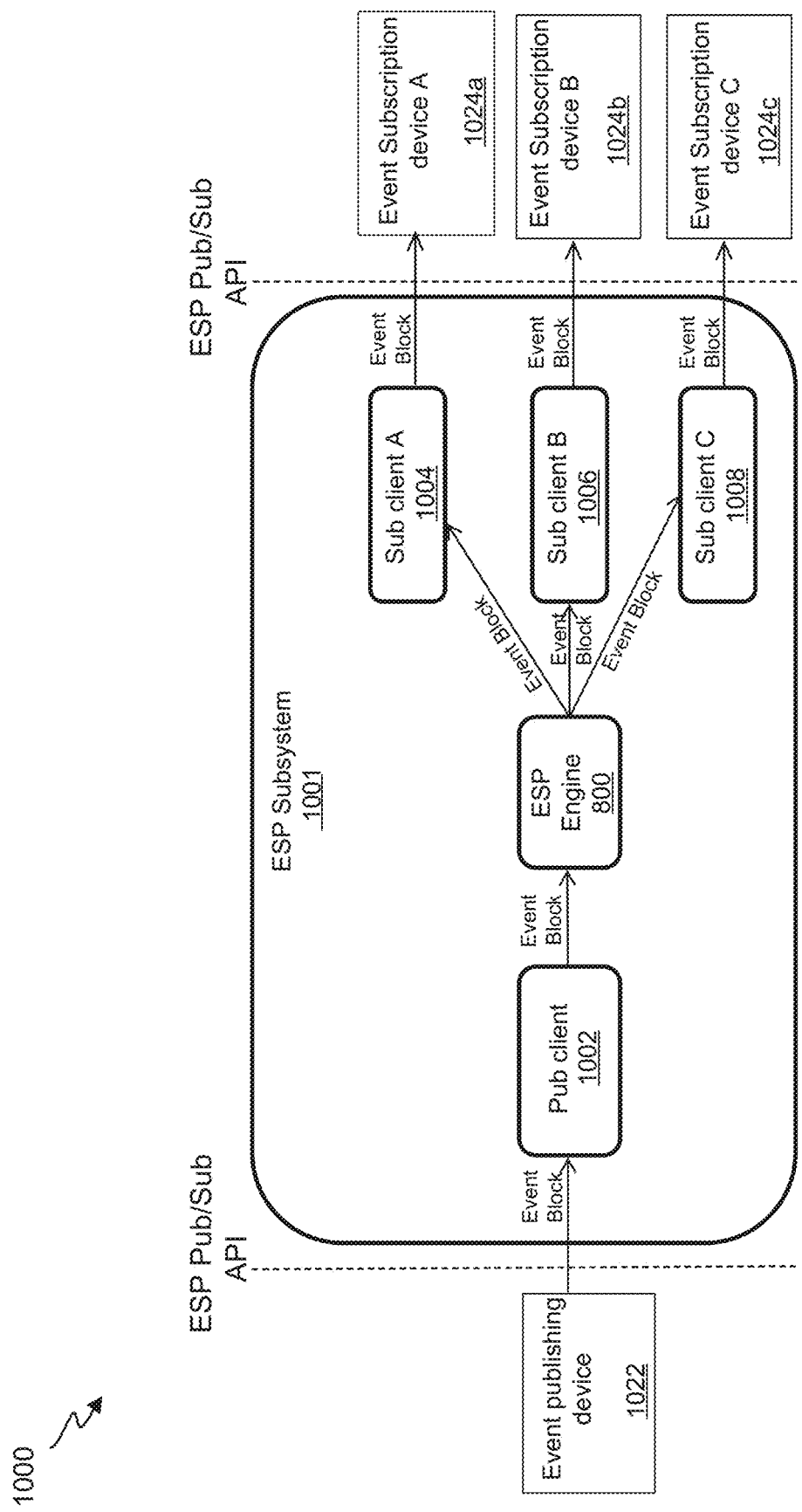
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may include automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
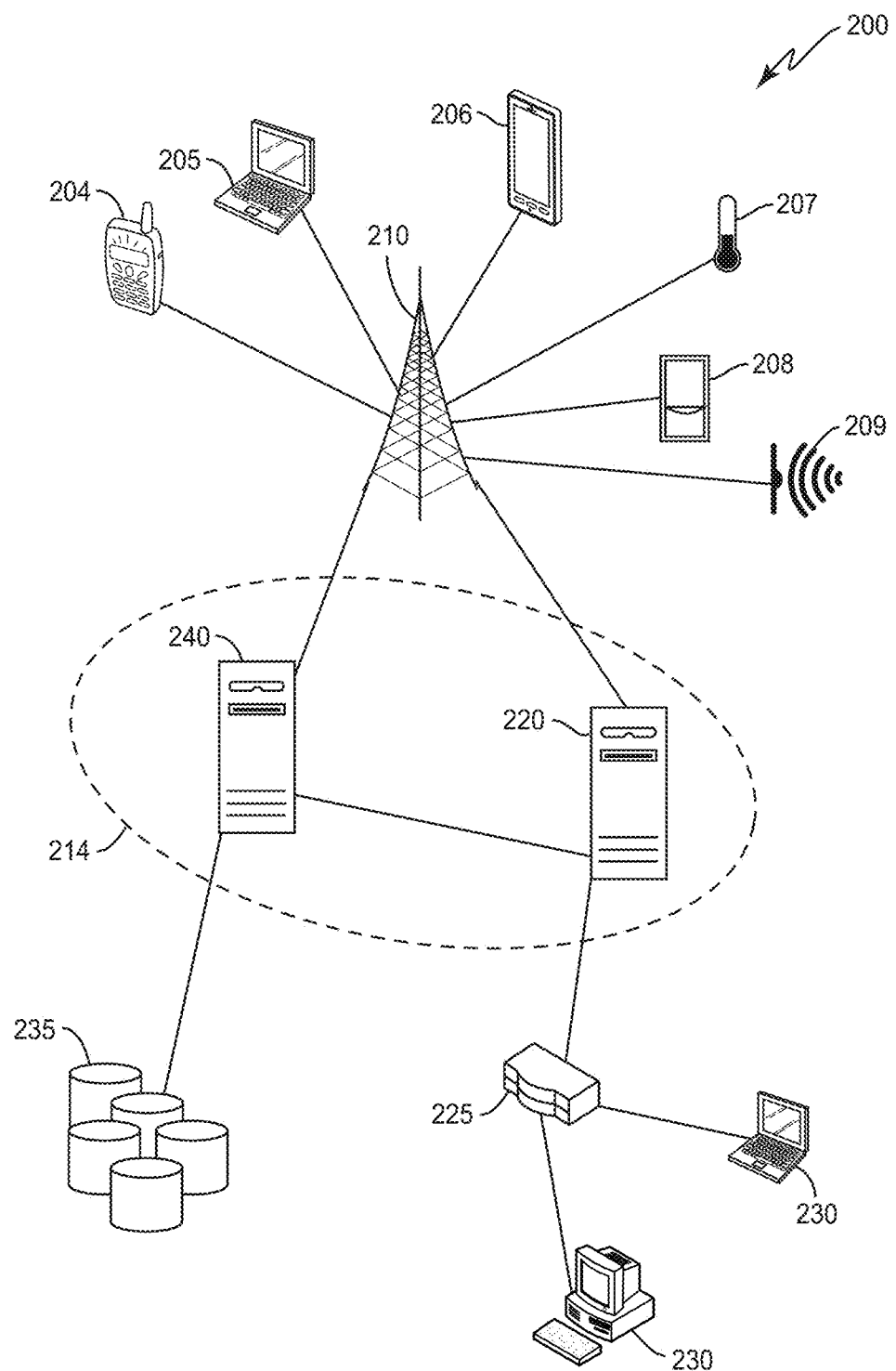
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
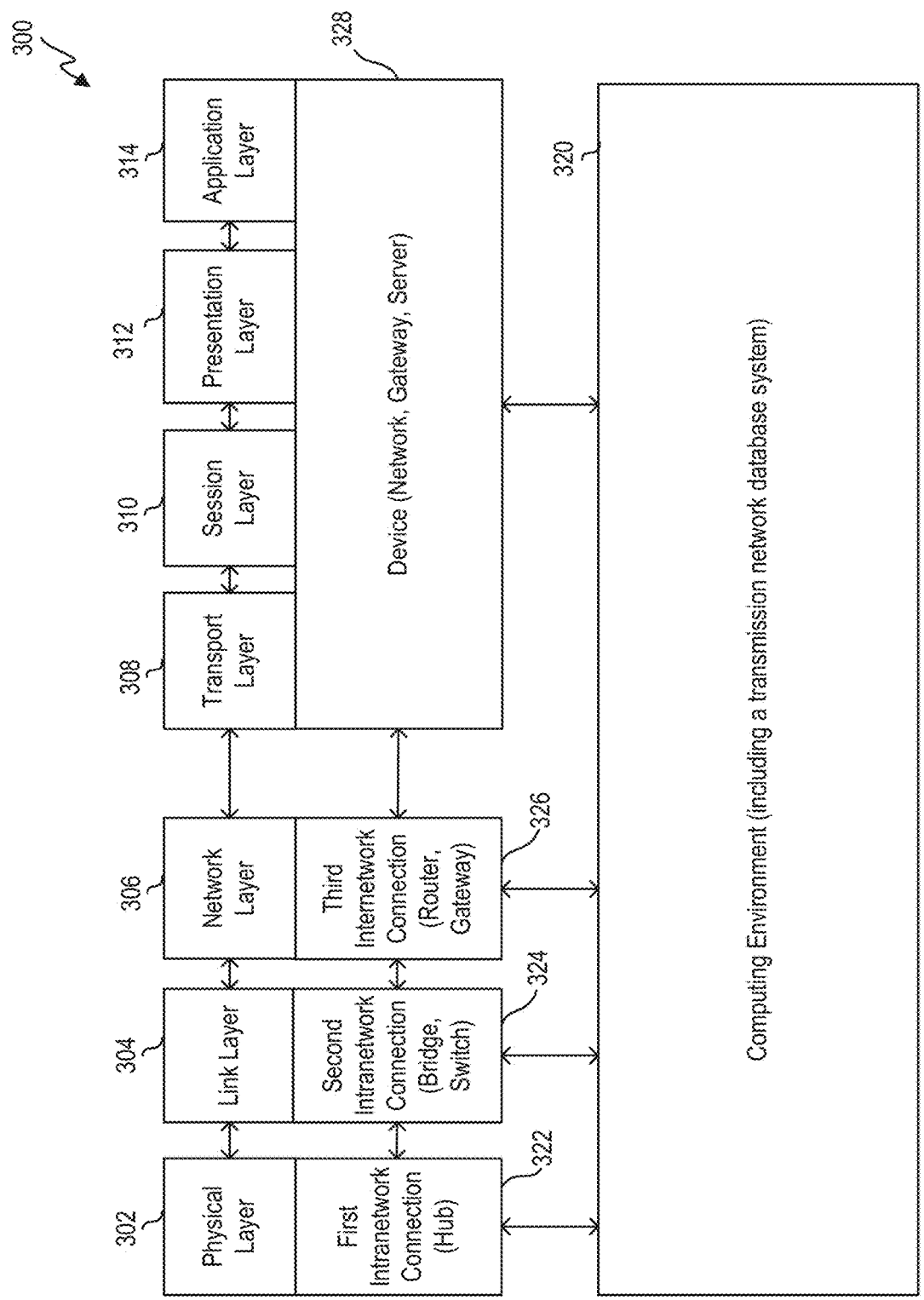
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 320 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data and is the farthest layer from the user in a communications system. On the other hand, the application layer is the highest layer because it interacts directly with a software application.

As noted, the model includes a physical layer 302. Physical layer 302 represents physical communication and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer and a switch can operate in the link layer. Inter-network connection components 326 and 328 are shown to operate on higher levels, such as layers 306-314. For example, routers can operate in the network layer and network devices can operate in the transport, session, presentation, and application layers.

As noted, a computing environment 320 can interact with and/or operate on, in various embodiments, one, more, all or any of the various layers. For example, computing environment 320 can interact with a hub (e.g., via the link layer) so as to adjust which devices the hub communicates with. The physical layer may be served by the link layer, so it may implement such data from the link layer. For example, the computing environment 320 may control which devices it will receive data from. For example, if the computing environment 320 knows that a certain network device has turned off, broken, or otherwise become unavailable or unreliable, the computing environment 320 may instruct the hub to prevent any data from being transmitted to the computing environment 320 from that network device. Such a process may be beneficial to avoid receiving data that is inaccurate or that has been influenced by an uncontrolled environment. As another example, computing environment 320 can communicate with a bridge, switch, router or gateway and influence which device within the system (e.g., system 200) the component selects as a destination. In some embodiments, computing environment 320 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 320 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
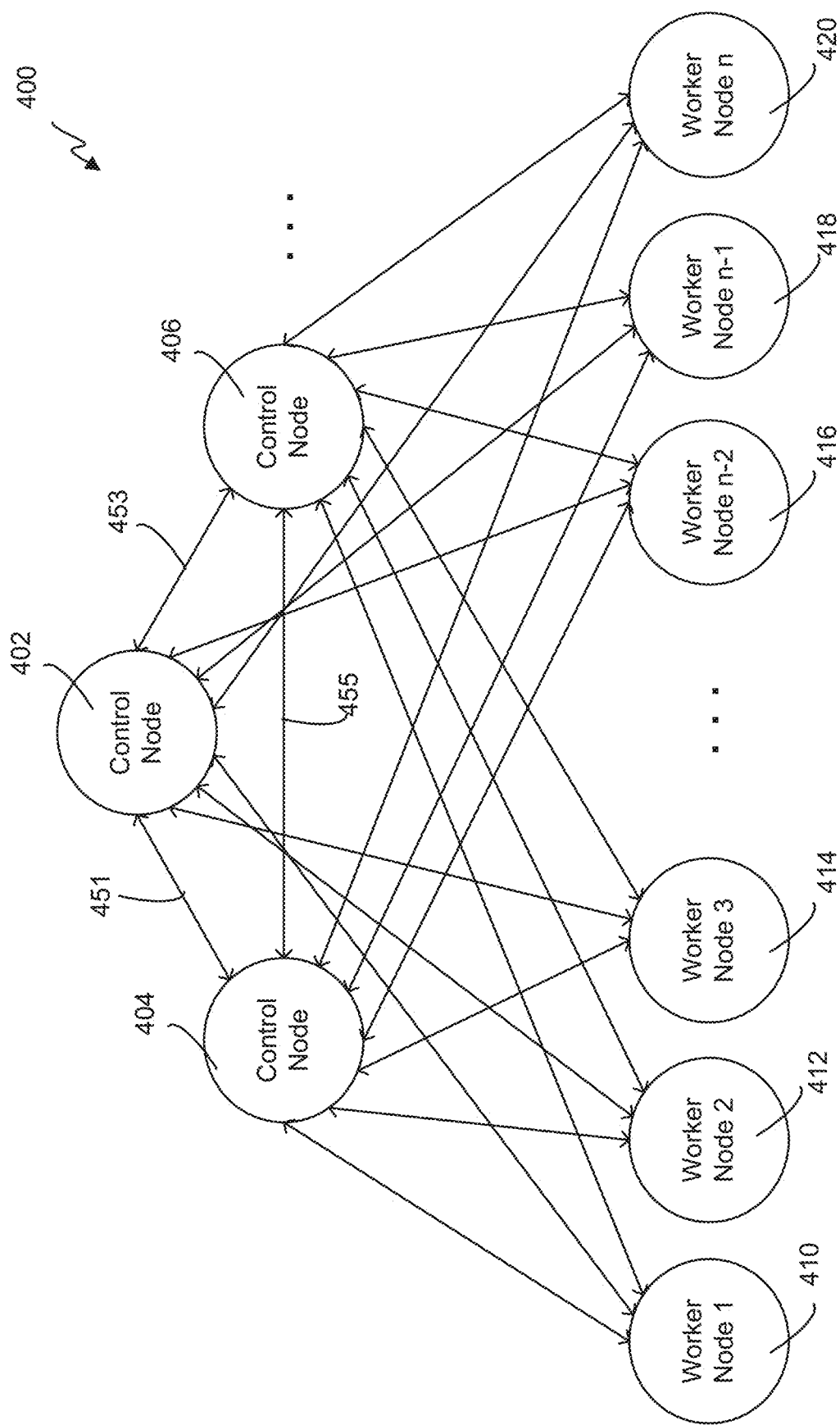
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
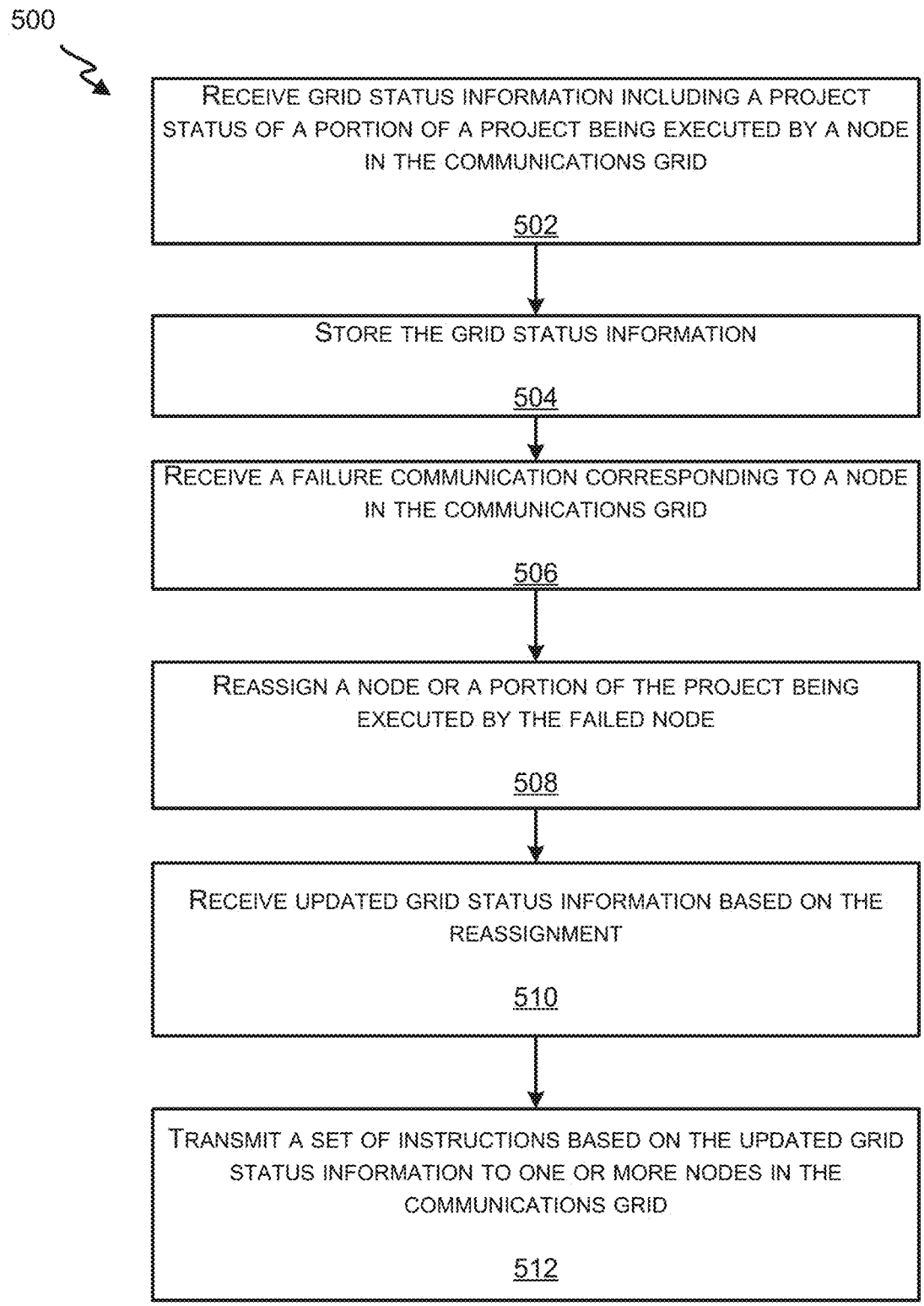
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
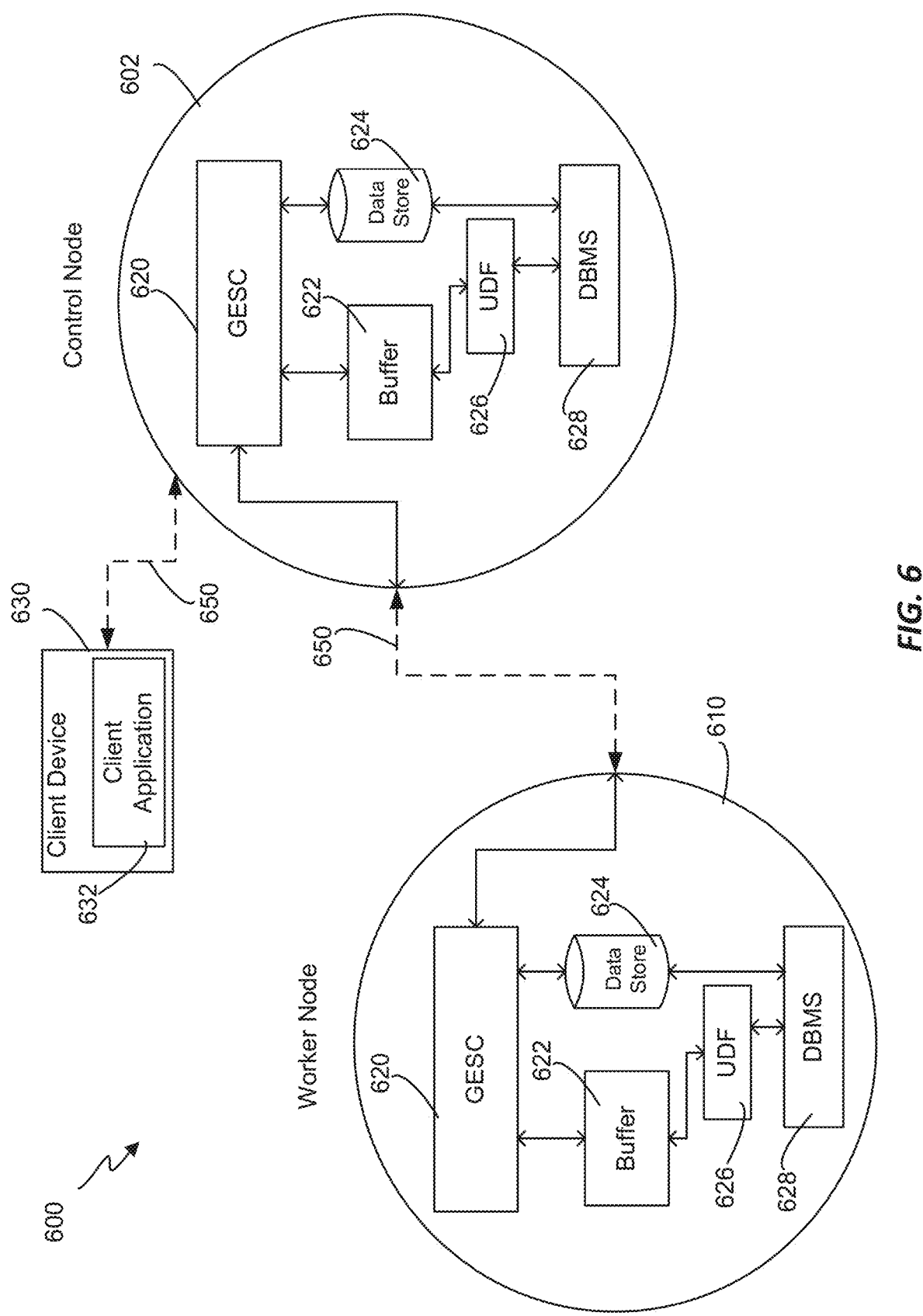
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
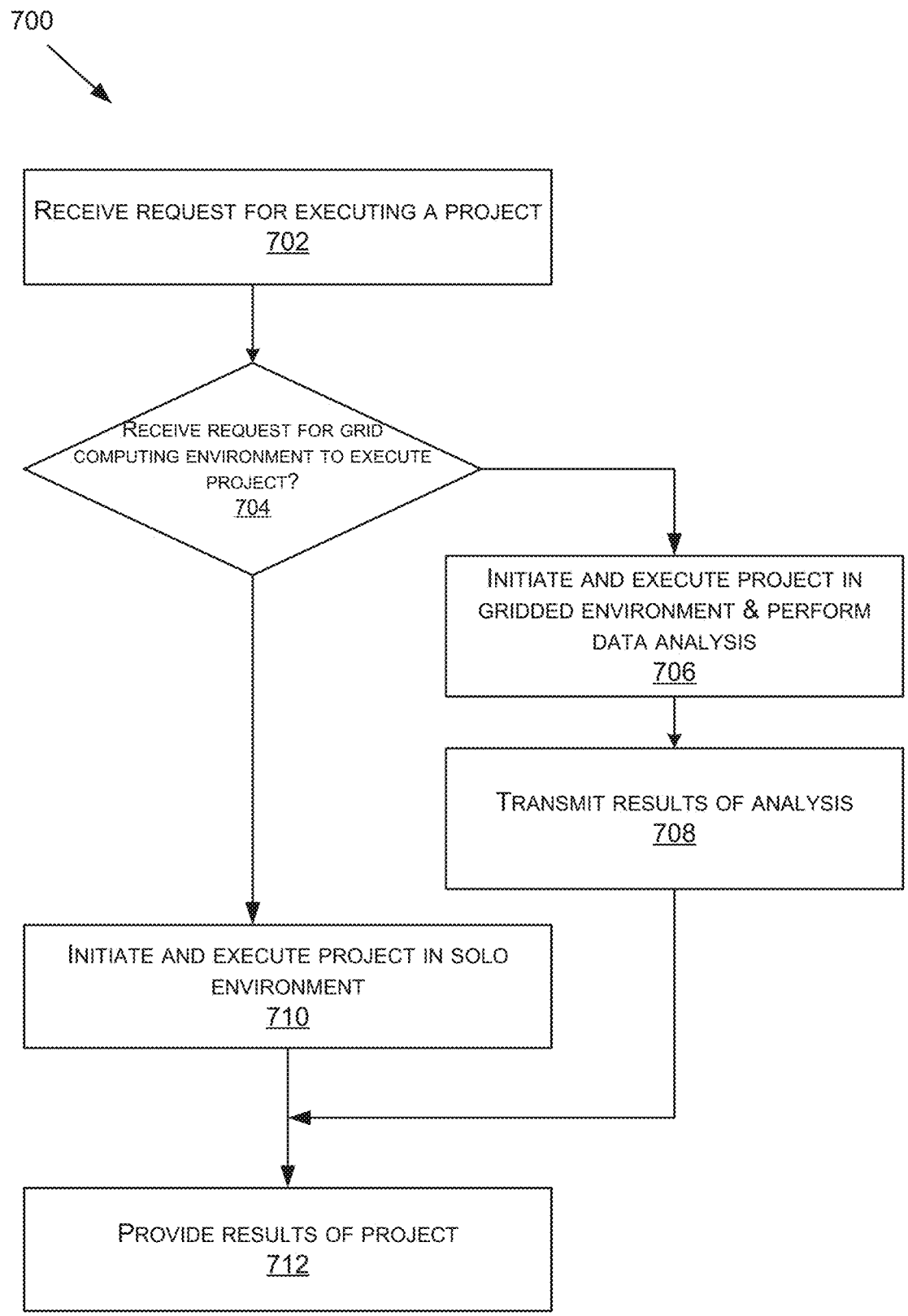
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
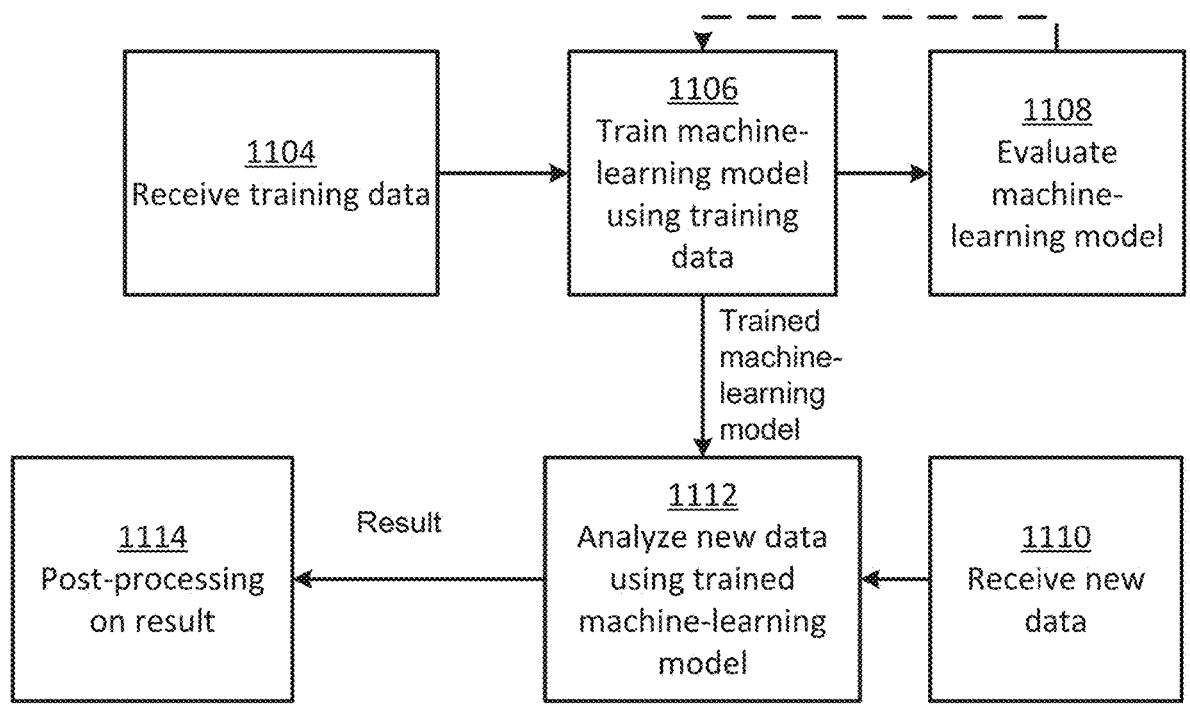
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS) 6, SAS Viya 6 of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
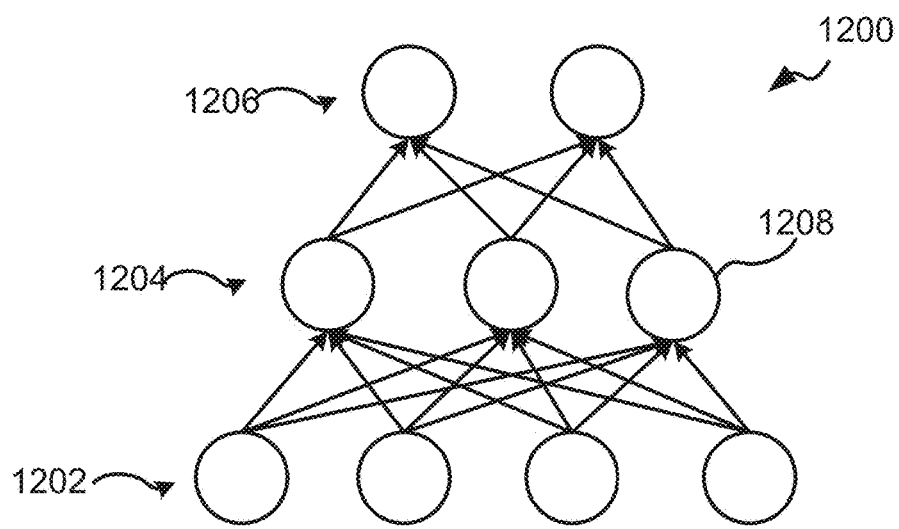
FIG. 12 illustrates an example of a machine-learning model as a neural network according to at least one embodiment of the present technology.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

One or more embodiments are related to a measurement system analysis. A measurement system analysis can be useful for evaluating a measurement process. For instance, a measurement system analysis can be used to ensure that data being collected on measuring products is accurate and appropriate. This can ensure products tested according to the measurement system are properly being manufactured. For instance, measured products could include industrial products such as chemicals, metals, ceramics, polymers, composites, woods, or a combination of materials, etc. The industrial product measured in the measurement system analysis may be consumed, used to produce, or form a component of a manufactured product in a final form. For instance, the industrial product could include a blade part for a table saw. The measurement analysis could involve analyzing a measurement procedure for the blade (e.g., measuring the blade's circumference or thickness for the manufactured table saw). As another example, the industrial product could be a part that is a chip pattern for manufacturing a computer chip. The measurement analysis could involve analyzing a measurement procedure for the chip pattern used to produce the computer chip (e.g., measuring to ensure the chip pattern is within a design specification). As another example, the industrial product could be a chemical for forming, or consumed in forming, a cleaner. The measurement system analysis could involve analyzing a measurement procedure for the chemical (e.g., for measuring its pH or volume needed for the cleaner).

A measurement system can have a system of different measurement components (such as gauges, fixtures, software, and personnel) that enables the quantification, validation, or assessment of characteristics of an industrial product. Analyzing a complex system like a measurement system can be resource and time intensive. For example, a test of a measurement system could include testing different operators (e.g., people with different skill levels and training for measuring a saw blade), testing different measurement tools (e.g., gauges, fixtures, test equipment, and/or calibration systems for measuring a chip pattern), testing different sampling plans or measurement plans (e.g., different approaches for selecting sampled saw blades), and testing different environments (e.g., testing properties of a chemical at different temperatures or humidity).

Embodiments herein enable a user to create a design for a measurement system. A measurement system analysis can comprise tests for evaluating, according to a measurement standard, an industrial product set comprising one or more industrial products (e.g., different chemical samples for measurement). A user can perform diagnostic measures that will allow the user to evaluate the properties of the design prior to experimentation (e.g., balance of tested conditions, variance proportions, monitoring classification, and probability of specification limit failure). Alternatively, or additionally, embodiments provide a computer-generated approach for generating likelihoods for candidate evaluations of an industrial product set according to a measurement system design prior to conducting a measurement system analysis. For instance, a computing system can indicate how likely a measurement system analysis is to classifying according to a particular classification system like an EMP categorization, a Gauge R&R study, an Analysis of Variance (ANOVA) and an average/range test. This computer-generated information can be useful for a user to ensure that the measurement system analysis would beneficially classify a measurement system before investing time and resources into the testing. If the computing system indicates the measurement system would not beneficially classify, the user can adjust the measurement system (e.g., to limit variations in certain system components). For instance, users can interact with the computing system to provide different prior estimates of variances for measurement system components to assess the properties of a design across different scenarios.

Figure 13:
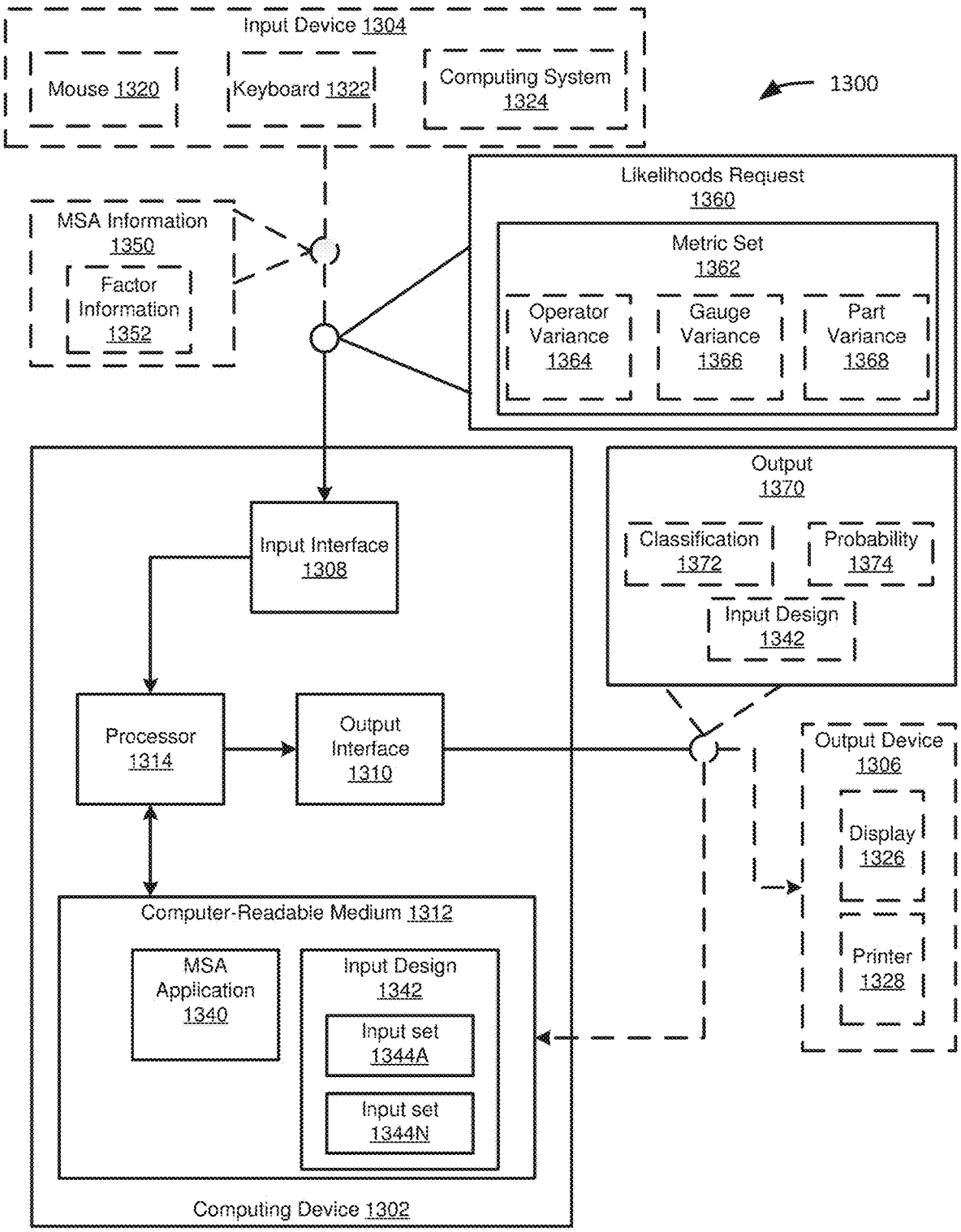
FIG. 13 illustrates a block diagram of a system for outputting one or more computer-generated likelihoods for candidate evaluations of an industrial product set according to at least one embodiment of the present technology.

FIG. 13 illustrates a system 1300 for outputting one or more computer-generated likelihoods for candidate evaluations of an industrial product set. System 1300 includes a computing device 1302.

In one or more embodiments, the computing device 1302 includes one or more input interfaces 1308 for receiving measurement system analysis information 1350. For instance, the measurement system analysis information 1350 may indicate factor information 1352 of factors for consideration in the measurement system analysis (e.g., environmental influences on the measurement system analysis). One example would be an operator factor indicating multiple operator characteristics in an operator set, such as number of operators and different types of operators performing measurements. Additionally, or alternatively, the factor information 1352 could include a gauge factor indicating measurement tools of a tool set (e.g., number of measurement tools, different types, or calibrations of measurement tools). Additionally, or alternatively, the factor information 1352 could include a part factor indicating a number or type of industrial product for analysis. For example, if the measurement system analysis is for measuring a rotating saw, factors in the measurement system analysis could include a part factor for a measured blade in the rotating saw, an operator factor for the operators measuring the saw blade, and a gauge factor for the calibration of the ruler for measuring the saw blade. Alternatively, or additionally, the measurement system analysis information 1350 may be predefined (e.g., a default operator factor, product factor, and gauge factor may be predefined).

A measurement system analysis can comprise one or more measurement tests for evaluating, according to a measurement standard, the industrial product set comprising one or more industrial products. For example, different tests could have different operators, different rulers, and/or different measured parts (e.g., if the measurement parts are destroyed in testing or to have different samples). An individual measurement test could have a respective setting for each member of a factor set comprising one or more factors of the measurement system analysis (e.g., a particular operator, a particular ruler, and a particular blade identification in a measurement test for a saw blade).

In one or more embodiments, the computing device 1302 includes one or more input interfaces 1308 for receiving (e.g., via a graphical user interface) a request 1360 for one or more computer-generated likelihoods for respective candidate evaluations. The request 1360 can be, for example, a request for one or more computer-generated likelihoods for respective candidate evaluations of an industrial product set according to the measurement system analysis. For instance, the request could be for a likelihood of classification into one of multiple groups for the industrial product set according to a measurement standard or a likelihood of going beyond a threshold related to the measurement standard. For instance, the request could be for likelihoods of being classified into monitoring types for an EMP monitoring classification. As another example, if the part could fail to work or safely operate at a certain level (such as a size or material hardness), the computer-generated likelihood could relate to a probability that the part would be determined under or over a level according to the measurement process (e.g., over a certain size or under a material hardness). Additionally, or alternatively, the request could be for a likelihood of a particular variance estimate, or variance contribution to a total variation (i.e., an estimated proportion or range of estimated proportions) in a measurement system analysis. The request 1360 could be a request for an evaluation or prediction related to the measurement system analysis before conducting the measurement system analysis (e.g., an evaluation or prediction for one or more candidate outcomes for a measurement system analysis or a measure of uncertainty for the evaluation or prediction).

In one or more embodiments, the request 1360 indicates a metric set 1362 for processing the request. For example, the request 1360 could include a metric set representing one or more metrics each quantifying, prior to the measurement system analysis, an estimate of contribution to variation in evaluating the industrial product set according to the measurement system analysis. For instance, a user may have an assumed variance indicating a user estimate for an environmental influence on the measurement system analysis. As an example, the metric set could include an operator variance 1364 assumed for an operator set comprising one or more operators measuring, in the measurement system analysis, at least one of the industrial product set. Additionally, or alternatively, the metric set includes a gauge variance 1366 assumed for a tool set comprising one or more measurement tools for measuring, in the measurement system analysis, at least one member of the industrial product set. Additionally, or alternatively, the metric set includes a part variance 1368 assumed for operation of the industrial product set in the measurement system analysis.

The request 1360 can be received from another computing system 1324 or can be input by a user of the system 1300 (e.g., a keyboard 1322 or mouse 1320 for user entry of data). Additionally, or alternatively, the input interface 1308 comprises an internal interface (e.g., the computing device comprises a touch screen for user entry of data or for employing stored defaults). A metric indicated by the request could be supplied by the user. For instance, the user may estimate that measurements of the measurement system process will vary by a certain amount depending on the time of day or location, so the user may specify an environmental assumed variance for an environmental variance. Additionally, or alternatively, a metric could be a default in the computing system (e.g., there may be some estimated variation from a measurement tool from another measurement system analysis). Alternatively, or additionally, the computing system could indicate that metrics and/or factors be authorized by a user such as providing an alert if a user tries to delete a part factor or fails to provide an assumed variance for the part factor.

In one or more embodiments, the computing device 1302 includes one or more output interfaces 1310 for outputting output 1370 related to a measurement system analysis. For example, the output 1370 could be related to computer-generated likelihoods for a likely classification 1372 or probability 1374 for a measurement system analysis. Additionally, or alternatively, the output 1370 comprises an input design 1342 for controlling testing of a measurement system analysis. The outputting based on received information can occur before a measurement system analysis is performed. This can enable a user to save resources initially planned for the measurement system analysis if it is unlikely to produce a user desired outcome for the measurement system analysis. The generated diagnostics can be used to improve the measurement system analysis. For instance, test planner users could save resources or better allocate resources if they find that what they had planned for is more than enough to get a sufficient outcome. Additionally, or alternatively, test planner users could realize they do not have enough resources to achieve their goals. The test planner user could then request additional resources or at least be aware of the limitations of the measurement system analysis going in. If they have limited resources, it will allow the test planner user to determine how best to allocate those resources to get the most useful information out of the study.

Output interface 1310 may be an internal interface (e.g., to display on a graphical user interface displayed by the computing device 1302) or output to one or more output devices 1306 (e.g., display 1326 or printer 1328) of system 1300.

The system 1300 is configured to exchange information between devices in the system (e.g., via wired and/or wireless transmission). For example, a network (not shown) can connect one or more devices of system 1300 to one or more other devices of system 1300. Alternatively, or additionally, the system is integrated into one device (e.g., a touch screen for entry and display of information).

The computing device 1302 has a computer-readable medium 1312 and a processor 1314. Computer-readable medium 1312 is an electronic holding place or storage for information so the information can be accessed by processor 1314. Computer-readable medium 1312 can include, but is not limited to, any type of random-access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1314 executes instructions (e.g., stored at the computer-readable medium 1312). The instructions can be carried out by a special purpose computer, logic circuits, or hardware circuits. In one or more embodiments, processor 1314 is implemented in hardware and/or firmware. Processor 1314 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1314 in one or more embodiments can retrieve a set of instructions from a permanent memory device and copy the instructions in an executable form to a temporary memory device that is generally some form of RAM, for example. Processor 1314 operably couples with components of computing device 1302 (e.g., input interface 1308, output interface 1310 and computer-readable medium 1312) to receive, to send, and to process information.

In one or more embodiments, computer-readable medium 1312 stores instructions for execution by processor 1314. In one or more embodiments, one or more applications stored on computer-readable medium 1312 are implemented in software (e.g., computer-readable and/or computer-executable instructions) stored in computer-readable medium 1312 and accessible by processor 1314 for execution of the instructions. The one or more application can be integrated with other analytic tools, data analytics software application and/or software architecture such as that offered by SAS Institute Inc. of Cary, N.C., USA. Merely for illustration, the applications are implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA.

One or more applications stored on computer-readable medium 1312 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

For example, in one or more embodiments, the computer-readable medium 1312 comprises instructions for a measurement system analysis application 1340. The measurement system analysis application 1340 can generate and output an input design 1342 for the measurement system analysis. Additionally, or alternatively, the measurement system analysis application can output (e.g., based on the metric set 1362 and/or the input design 1342) one or more computer-generated likelihoods for the respective candidate evaluations of the industrial product set according to the measurement system analysis. For example, the input design 1342 can comprise a respective input set 1344 for each respective measurement test of the measurement system analysis. The respective input set 1344 comprises one or more settings for conducting the respective measurement test of the measurement system analysis. The input design 1342 is designed to isolate candidate sources for contributing to the variation in evaluating the industrial product set according to the measurement system analysis (e.g., the effect of operators on the variation, the effect of gauges or parts on the variation, and the effect of a particular combination of an operator and gauge on the variation). The variation makes it difficult to compute likelihoods of candidate evaluations for the measurement system analysis. To determine the likelihood for a candidate evaluation, the measurement system analysis application 1340 may run complex or numerous simulation scenarios to simulate results for a simulation of the measurement system analysis according to the input design 1342 with the assumptions of the metric set 1362.

In one or more embodiments, fewer, different, and additional components can be incorporated into computing device 1302. For instance, in one or more embodiments, there are multiple input devices or computing systems (e.g., one to input the request 1360 and another to input the measurement system analysis information 1350). In the same or different embodiments, there are multiple output devices or computing systems (e.g., one to display the output 1370 and one to print the output 1370).

As another example, the same interface supports both input interface 1308 and output interface 1310. For example, a touch screen provides a mechanism for user input and for presentation of output to the user. Alternatively, the input interface 1308 has more than one input interface that uses the same or different interface technology. Alternatively, or additionally, the output interface 1310 has more than one output interface that uses the same or different interface technology.

In one or more embodiments, a computing system (e.g., the system 1300 or computing device 1302) implements a method as described herein (e.g., a method shown in FIG. 14) for outputting one or more computer-generated likelihoods for candidate evaluations of an industrial product set.

Figure 14:
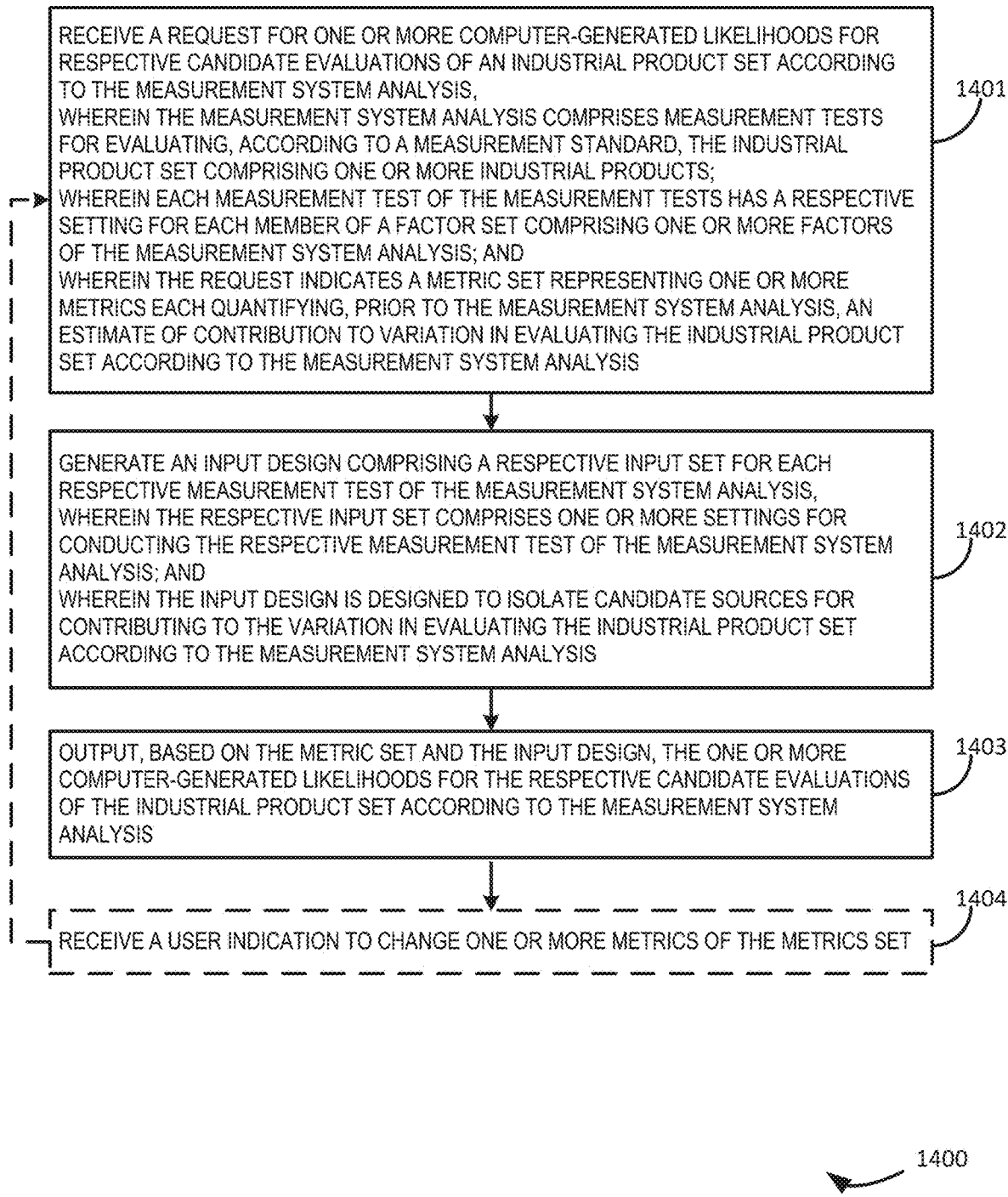
FIG. 14 illustrates a flow diagram for outputting one or more computer-generated likelihoods for candidate evaluations of an industrial product set according to at least one embodiment of the present technology.

FIG. 14 illustrates a flow diagram for a method 1400 of outputting one or more computer-generated likelihoods for candidate evaluations of an industrial product set. The method 1400 can be conducted, for example, prior to a measurement system analysis.

The method 1400 comprises an operation 1401 for receiving a request for one or more computer-generated likelihoods for respective candidate evaluations of an industrial product set according to the measurement system analysis. The request can be explicit or implicit. For instance, the user may request, via a graphical user interface, to generate an input design for the measurement system analysis, which triggers or provides further options to the user for a generation of an assessment of that input design (e.g., one or more computer-generated likelihoods for candidate evaluations).

The measurement system analysis comprises measurement tests (e.g., as defined by an input design) for evaluating, according to a measurement standard, the industrial product set comprising one or more industrial products. Each measurement test of the measurement tests has a respective setting for each member of a factor set comprising one or more factors of the measurement system analysis. The request indicates a metric set representing one or more metrics each quantifying, prior to the measurement system analysis, an estimate of contribution to variation in evaluating the industrial product set according to the measurement system analysis. For instance, the user may enter into a graphical user interface certain values for variances for certain factors, or combination of factors, or accept default variances.

The method 1400 comprises an operation 1402 for generating an input design comprising a respective input set for each respective measurement test of the measurement system analysis. The respective input set comprises one or more settings for conducting the respective measurement test of the measurement system analysis. The input design is designed to isolate candidate sources for contributing to the variation in evaluating the industrial product set according to the measurement system analysis. For example, if a candidate source for contributing to the variation is an operator, the input design will provide coverage for a balance of tests for different operators with controlled inputs for other factors.

The method 1400 comprises an operation 1403 for outputting, based on the metric set and the input design, the one or more computer-generated likelihoods for the respective candidate evaluations of the industrial product set according to the measurement system analysis. For instance, different probabilities for classifications or outcomes for the measurement system analysis may be output.

The method 1400 comprises an operation 1404 for receiving a user indication to change one or more metrics of the metrics set. For instance, the output could be an output to a graphical user interface with an initial output for the one or more computer-generated likelihoods for candidate evaluations and the metric set. The method could repeat operations to generate an updated output (e.g., dynamically or ad hoc update the graphical user interface to display an updated output for the one or more computer-generated likelihoods for candidate evaluations that accounts for the user indication). This way the user can determine if variance of a particular factor should be changed to get a desired outcome for the measurement system analysis. For instance, the user may be able to input a lower variance for operators if the user invests in changing the training process for operators or select operators with a certain training to reduce overall variance in the measurement system analysis.

Operations in method 1400 could be performed in a different order than presented in this example. For instance, operation 1402 could be performed simultaneously or before operation 1401. More or fewer operations could be performed. For instance, operation 1404 could be optionally performed in some embodiments.

FIGS. 15A-15D illustrate example graphical user interfaces for generating likelihoods for candidate evaluations of an industrial product set.

Figure 15A:
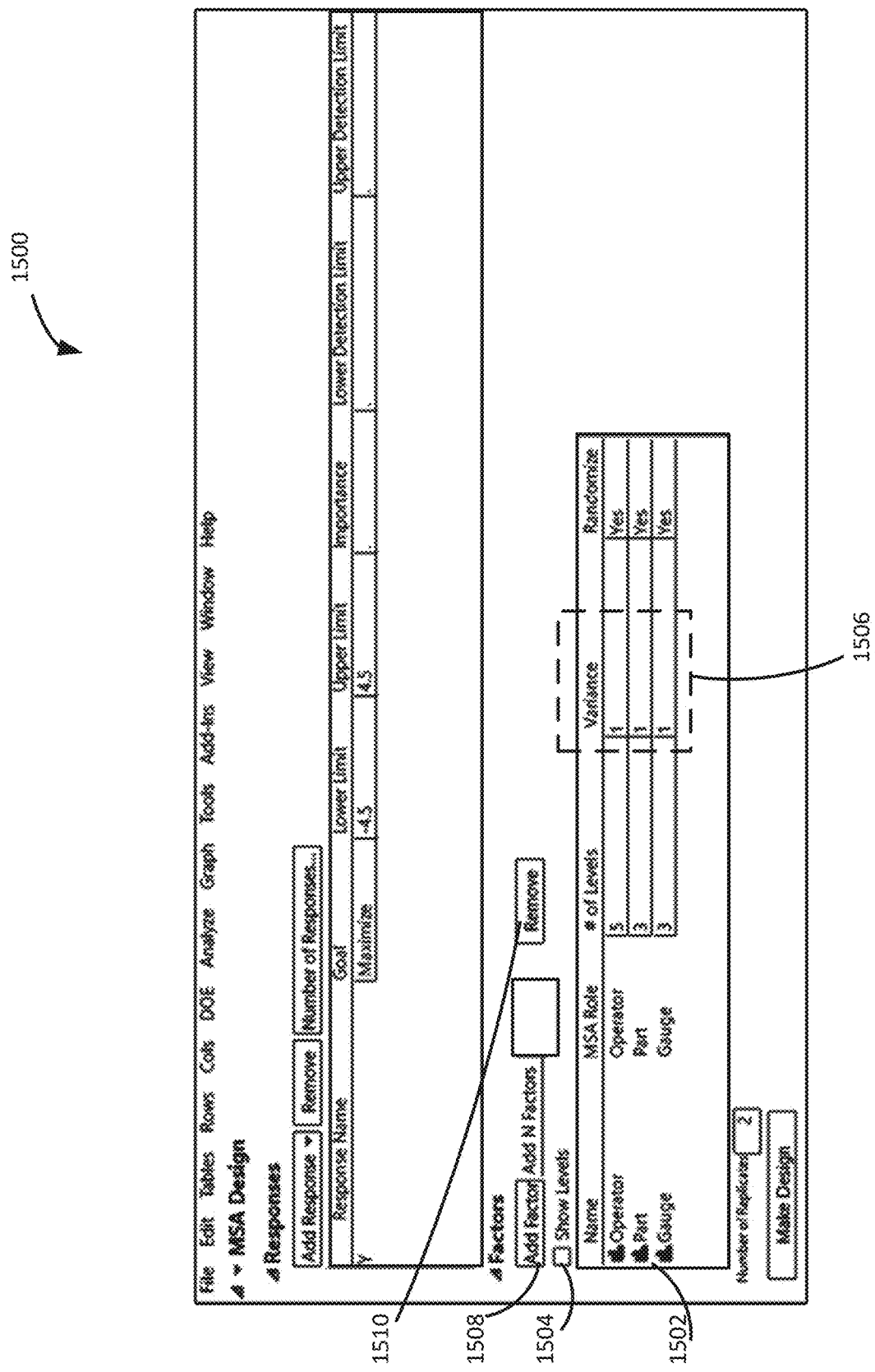

FIG. 15A shows an example graphical user interface 1500 with features specific to measurement system analysis. In this example, users can specify the role of a factor in factor portion 1502 of graphical user interface 1500. The factors in this example have specified roles with a particular interpretation in measurement system analysis including an operator factor, part factor, and gauge factor. Additionally, or alternatively, factors typical of measurement system analysis can be prepopulated in the graphical user interface for the user to add or remove factors as needed.

The computing system can receive a user indication to include one or more factors in the measurement system analysis (e.g., user acceptance of predefined factors or user specifying factors). For instance, in this example, the computing system receives a user indication to include multiple factors in the measurement system analysis including an operator factor indicating multiple operator characteristics in an operator set, a gauge factor indicating multiple measurement tools of a tool set, and a part factor in the measurement system analysis indicating multiple industrial products of a same type in the industrial product set. A user can add factors (e.g., environmental or blocking factors) using add factor control 1508 or can remove factors using remove control 1510 (e.g., if a part factor is not needed because a different part is used for every test).

Figure 15B:
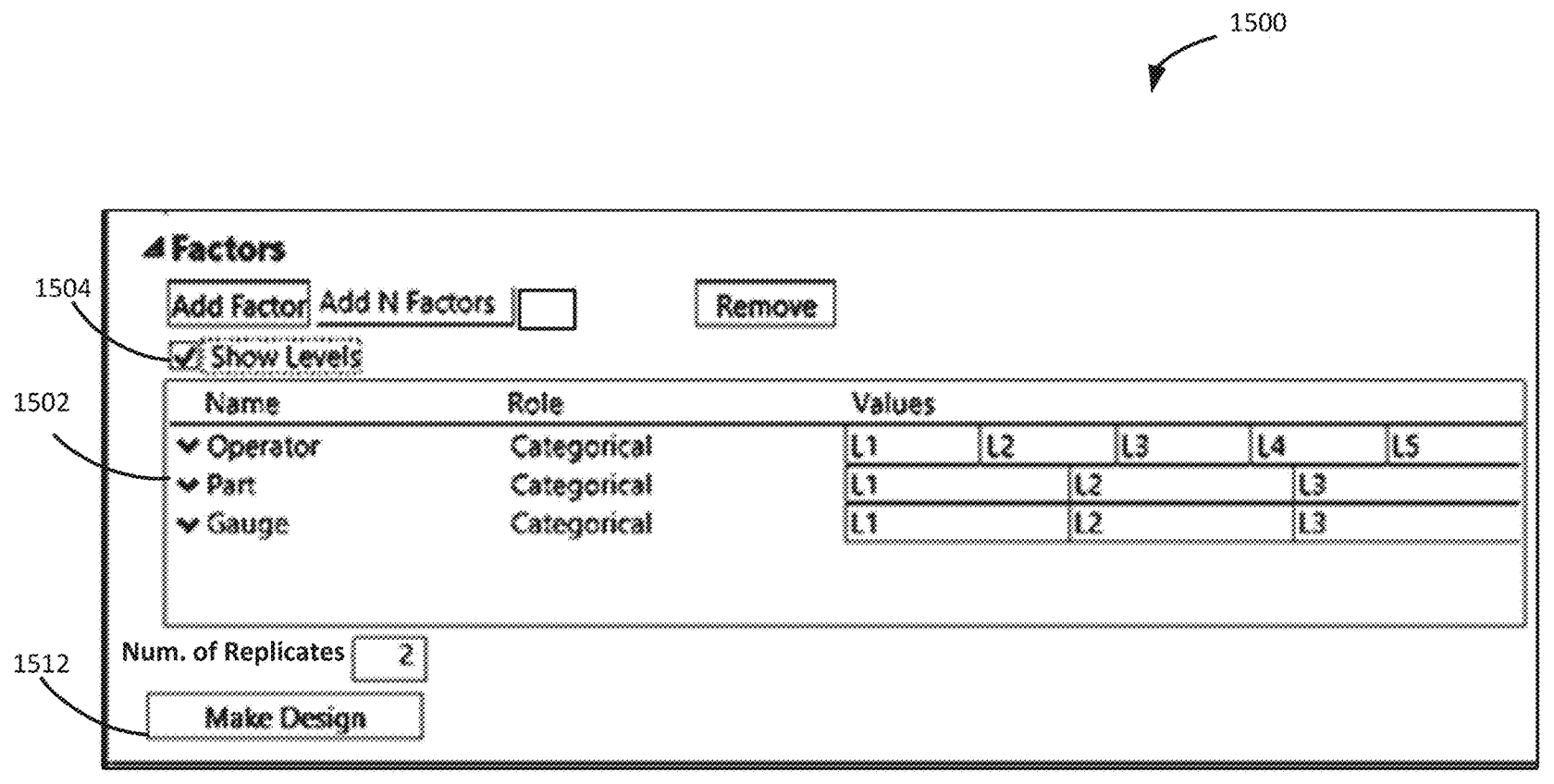

In one or more embodiments, users can specify or change default initial variance estimates for factors in variance column 1506 (e.g., a default variance of "1"). The variance estimates can be used to generate the initial design diagnostics. In this example, the user can rename a particular factor and/or levels by checking the Show Levels checkbox 1504 to reveal the current factor names and levels. FIG. 15B shows graphical user interface 1500 updated to shows level options in factor portion 1502 when Show Levels checkbox 1504 is checked. The user can also specify or adjust level options. For example, 5 levels (L1-L5) may be used to indicate five different operators will be conducting measurements in the measurement system analysis. Three levels of part factor (L1-L3) may indicate that there will be a sample size of 3 parts that are to be measured. Three levels of gauge factor (L1-L3) may indicate that there will be three different gauge or measurement techniques employed in the measurement tests. The factor rows can be interactive to change the quantity of levels or to name them to specific criteria (e.g., unique identifiers for the parts, operators, or gauges).

The design control 1512 can be used to generate a design for the measurement system analysis (e.g., a design that provides an indication of which of the levels to use in each measurement test for the different factors). The computing system can receive a request for one or more computer-generated likelihoods for candidate evaluations responsive to the selection of the design control 1512 or further control options. The request can indicate a metric set. In this example, the metric set indicates multiple metrics pertaining to the measurement system analysis including an assumed variance for the operator set comprising operators measuring at least one of the industrial product set (e.g., a variance for an operator factor); an assumed variance for the tool set comprising measurement tools for measuring at least one member of the industrial product set (e.g., a variance for a gauge factor); and an assumed variance for the industrial product set (e.g., a variance for a part factor). Assumed or accounted for variances for generating information prior to a measurement system analysis may also be considered an estimate or prior user guess of the variances that could be observed in a conducted measurement system analysis.

The computing system generates the input design by generating respective inputs associated with each of multiple operator characteristics of the operator set in the measurement system analysis (e.g., L1-L5 of operator factor), respective inputs associated with each of multiple measurement tools in the measurement system analysis (e.g., L1-L3 of gauge factor), and respective inputs associated with each of multiple industrial products of the industrial product set in the measurement system analysis (e.g., L1-L3 of part factor).

Figure 15C:
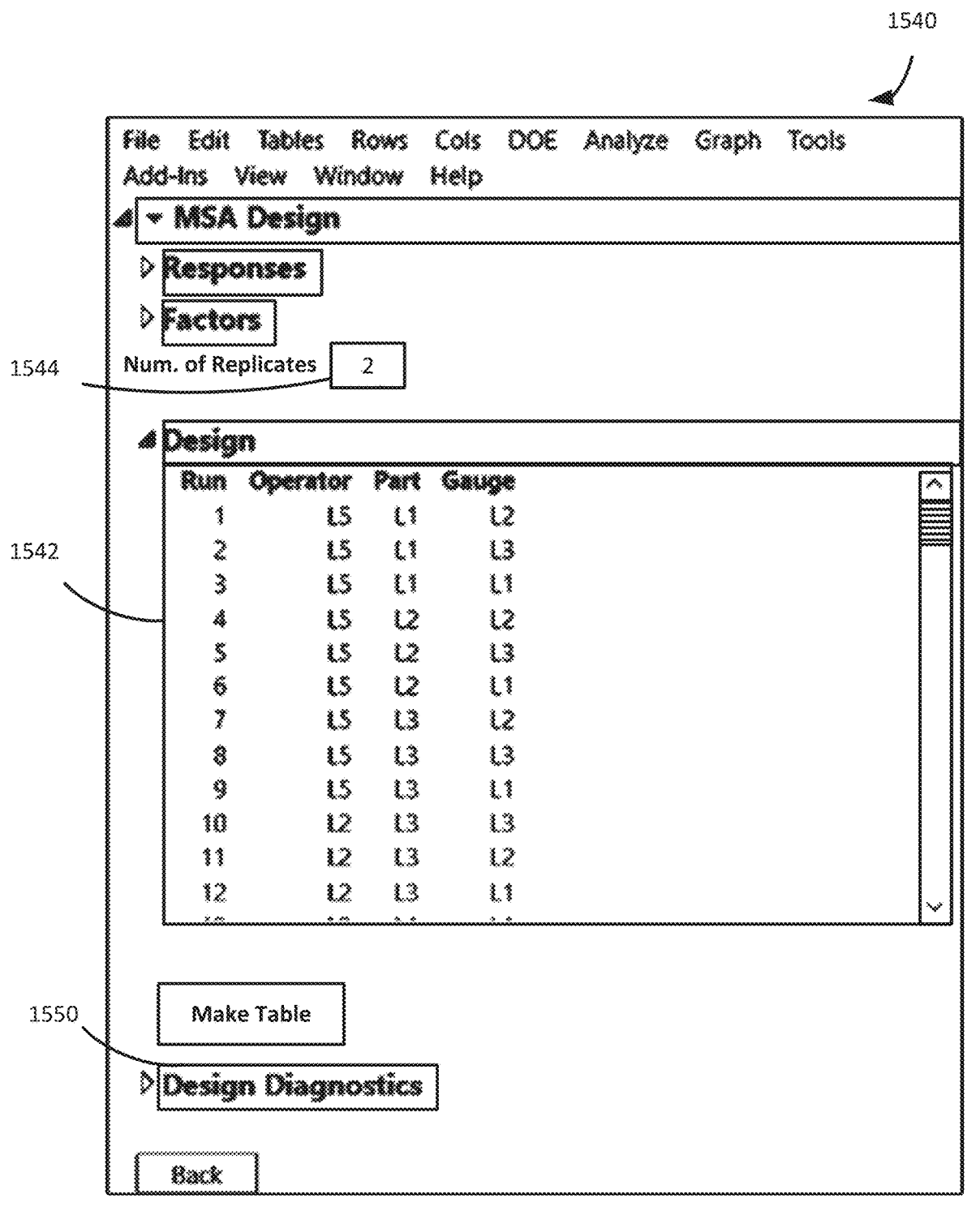

FIG. 15C shows a graphical user interface 1540 displaying a representation of the generated design in input design 1542 with specified inputs for each of the factors of discrete measurement tests (i.e., runs). In this case, the design is a full factorial design with the factors replicated according to the number of replicates specified (e.g., for different measurement studies in a measurement system analysis). In this example the number of replicates is specified in text box 1544 as "2" to indicate a total of three studies for the measurement system analysis.

Replicates for different measurement studies can be useful, for example, in situations where a part is repeated to look at whether reuse of a part in measurement testing influences the test outcomes. In this example, a part is repeated in the input design 1542 (e.g., runs 1-3 have a part L1).

Some measurement system analysis involves non-destructive tests for the industrial product set such that a member of the industrial product set is reused in testing according to the measurement system analysis. The request for computer-generated likelihoods for candidate evaluations of the industrial product set indicates a quantity of members of the industrial product set for testing. In this case, FIG. 15A specified 3 levels for a part factor for a sample size of 3 members. The computing system generated the input design 1542 in FIG. 15C for the measurement system analysis by generating respective conditions for testing each member of the industrial product set for multiple factors for the non-destructive test (e.g., gauge and operator factors). The input design 1542 comprises at least two different sets of conditions for each member of the industrial product set. Embodiments herein are applicable to other types of testing (e.g., where a part is destroyed). For instance, in a destructive test case, the part factor may have only one level specified, may be marked as nested within one or more other factors, and/or provide for the user to indicate a destructive test case, so the user need not specify a part factor (e.g., in implementations where a part factor is provided as a default).

In one or more embodiments, the computing system can output one or more computer-generated likelihoods for candidate evaluations accounting for an assumed variance for the factors (e.g., accounting for an assumed variance for a tool set, for an industrial product set, and an operator set).

For instance, in this example, the user can select the design diagnostics option 1550 to explore diagnostic measures that will allow users to evaluate the properties of their designs prior to experimentation. Further, the design diagnostics can be specific to measurement system analysis. For instance, with measurement system analysis design diagnostics there may be an emphasis on identifying a level of contributing variation from factors on response variation. For example, a simplified model for two factors could be represented as $$\sigma_{Total}^2 = \sigma_1^2 + \sigma_2^2 + \sigma_{1\times2}^2 + \sigma_{Error}^2$$

where σ is variance coming from factors or combinations of factors.

In contrast, more classic design diagnostics may emphasize identifying effects of factors on a response. A simplified model for two factors could be represented as $$Y = \beta_0 + \beta_1 X_1 + \beta_2 X_2 + \beta_1 X_1 X_2 + \varepsilon$$

where Y is the response, $X_1$ and $X_2$ are factors, Φ are used to weight factors in the model, and ε represents error in the model.

Figure 15D:
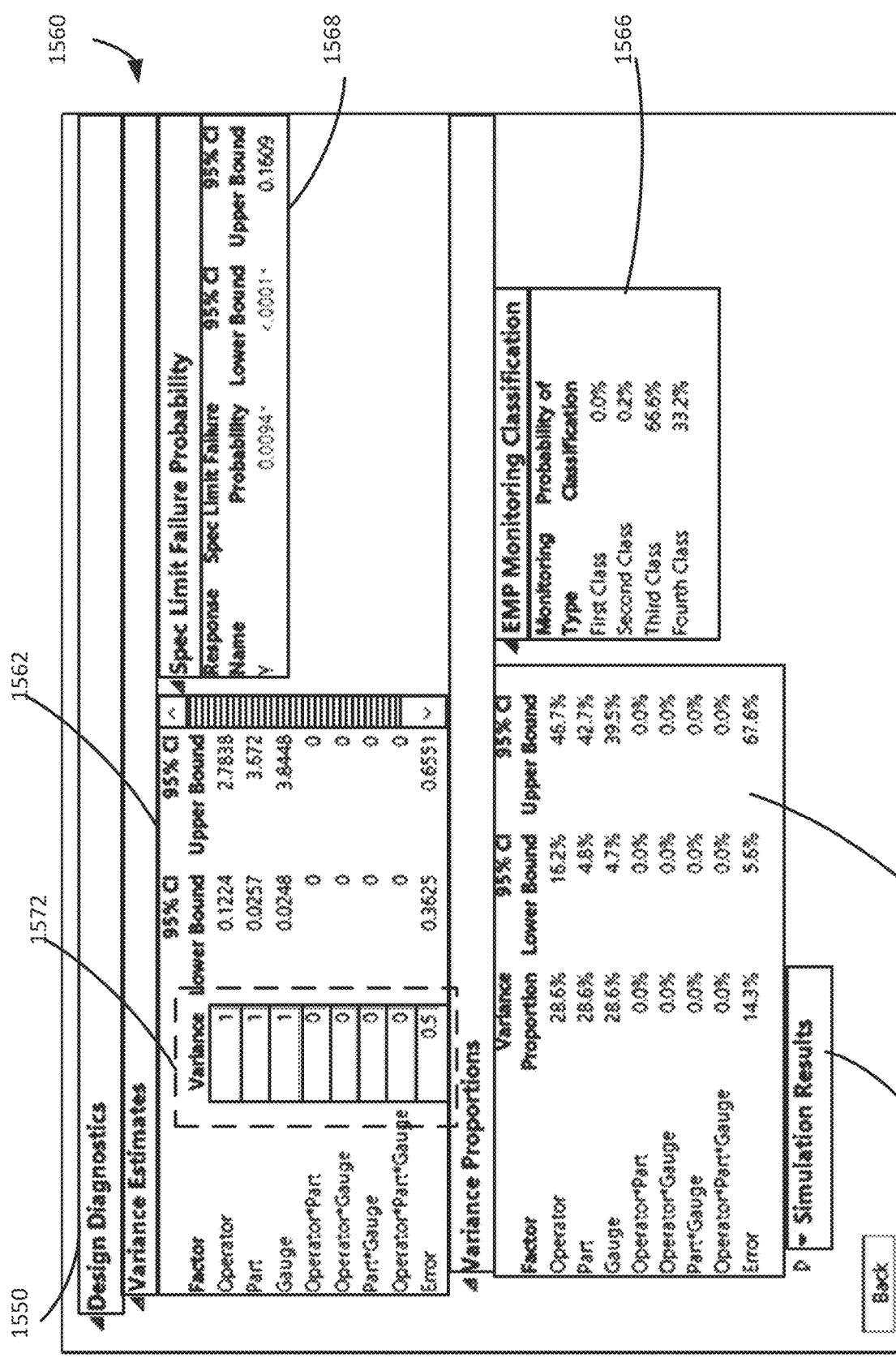

FIG. 15D shows an example graphical user interface 1560 with selected design diagnostics option 1550. In this example, the computing system has received a request for the computer-generated likelihoods for candidate evaluations where the request indicates a metric set comprises multiple metrics shown in variance column 1572. The multiple metrics indicate a first assumed variance ("1" for an operator factor) for an operator set comprising one or more operators measuring, in the measurement system analysis, at least one of the industrial product set. The multiple metrics indicate a second assumed variance ("1" for a gauge factor) for a tool set comprising one or more measurement tools for measuring, in the measurement system analysis, at least one member of the industrial product set. The multiple metrics indicate a third assumed variance ("1" for a part factor) for an operation of the industrial product set in the measurement system analysis. The computing system outputs to the graphical user interface 1560, one or more computer-generated likelihoods for candidate evaluations accounting for the first assumed variance, the second assumed variance, and the third assumed variance.

In this example, the user is presented with four diagnostic metric categories. These design diagnostics account for the variance estimates. The estimate portion 1562 presents users with the current assumed variances for each potential factor in the measurement system analysis along with the lower and upper bounds of a confidence interval (e.g., a 95% confidence interval), which can be used to assess the level or measure of uncertainty users can expect from the design.

This estimate portion 1562 is interactive in that the variances guesses in variance column 1572 can be edited by the user with corresponding confidence intervals. All other diagnostic measures can be updated by the computing system accordingly.

A measurement system analysis can be conducted to identify sources of variation for the product measurement outside of variation in the product itself. For instance, with operator variation, different individuals could have their own procedures for measuring product specifications. As another example with gauge variation different tools of the same type could have their own calibrations affecting variation.

The proportion portion 1564 presents the estimated variance proportions based on the current assumed variances along with corresponding 95% confidence intervals, which can be used to assess the level or measure of uncertainty users can expect on the variance proportions from the design. Different confidence intervals could be used (e.g., an 85% confidence interval). Estimates of proportion of variance are visually explained by factor, or combination of factors, based on current variances guesses with corresponding confidence intervals.

By identifying these external sources to a user, the user can selectively address sources for improvement of the measurement procedure (e.g., through standardized training, calibration, and/or other improvements to the measurement procedure). For instance, in this example, proportion portion 1564 displays in the graphical user interface 1560 estimate statistics for proportion of the variation attributable to an operator set. In this example, the operator factor has a variance proportion of 28.6% with 95% confidence interval bounds of 16.2% to 46.7%. In other words, the computing system can determine with 95% confidence the proportion of variation in a measurement system analysis that will come from the operator is between 16.2% and 46.7% of a total variation. Proportion portion 1564 displays in the graphical user interface 1560 estimate statistics for proportion of the variation attributable to a tool set (e.g., the gauge factor has a variance proportion of 28.6% with 95% confidence interval bounds of 4.8% to 42.7%). Proportion portion 1564 displays in the graphical user interface 1560 estimate statistics for proportion of the variation attributable to the operation of the industrial product set (e.g., the part factor has a variance proportion of 28.6% with 95% confidence interval bounds of 4.7% to 39.5%). These three sources of variation are estimated to equally contribute to the variation. However, the confidence interval information, may indicate that an operator is more likely to be a prominent contributor to the variation. In this case, a user may focus on minimizing variation in aspects of the operator set to improve the measurement system process and may then update the variance for the operator factor to see how this would affect the estimates before running a measurement system analysis. For instance, if the measurement process is to measure the circumference of a cylindrical part, some operators may be incorrectly calculating the circumference by using a diameter instead of a radius. By correcting this operator error, variance could be reduced by a factor of 4 or reduced from 1 to 0.25.

The EMP monitoring classification 1566 presents the probability of the measurement system analysis falling into one of four EMP monitoring classifications. These classifications indicate information regarding how well the measurement process can identify part-to-part variations. These classifications are described in more detail with respect to other examples. Other or additional classifications could be used in these example interfaces (e.g., classifications for control charts and Gauge R&R studies).

The specification portion 1568 presents the probability of the response falling outside the user-specified specification limits based on a standard normal distribution response with the current assumed variances for each factor affecting the process along with a 95% confidence interval, which can be used to assess the level or measure of uncertainty around the probability.

The metrics in this example are derived based on simulations computed by the computing system, which in turn are based on the assumed variances the user inputs at the design specification window (e.g., graphical user interface 1500 in FIG. 15A). The user can adjust those estimates in the editable table boxes of variance column 1572 to explore the properties of their design under different settings. This will allow them to create a more robust design for their needs.

Simulations of variance of estimates can be done based on different approaches (e.g., an ANOVA approach). For instance, the computing system can consider a three-factor measurement system analysis with a gauge, operator, and part factor according to the model:

$$\sigma_{Total}^2 = \sigma_{Gauge}^2 + \sigma_{Op}^2 + \sigma_{Gauge \times Op}^2 + \sigma_{Gauge \times Part}^2 + \sigma_{Op \times Part}^2 + \sigma_{Error}^2$$

where σ is variance coming from factors or combinations of factors (e.g., gauge×Op).

Estimates of each variance can be calculated using mean squares:

$$\hat{\sigma}_{Gauge}^2 = MS_{Gauge} - MS_{Gauge \times Op} - MS_{Gauge \times Part} + MS_{Error}$$

The mean squares have known distributions in a simulation. Once the variances have been simulated, they can be used to compute confidence intervals and variance proportions.

In this example, the simulations are computed based on method of moments estimates for the variances, which involve linear combinations of mean square terms. For example, for a design with three factors, an example ANOVA table is shown in Table

TABLE 1

| Factor | Number of Levels | Sum of Squares | Degrees of Freedom | Mean Square |
|---|---|---|---|---|
| Operator | a | SS_o | a-1 | MS_o = SS_o/(a-1) |
| Gauge | b | SS_g | b-1 | MS_g = SS_g/(b-1) |
| Part | c | SS_p | c-1 | MS_p = SS_p/(c-1) |
| Operator * Gauge | a * b | SS_og | (a-1)(b-1) | MS_og = SS_og/df |
| Operator * Part | a * c | SS_op | (a-1)(c-1) | MS_op = SS_op/df |
| Gauge * Part | b * c | SS_gp | (b-1)(c-1) | MS_gp = SS_gp/df |
| Operator * Gauge * Part | a * b * c | SS_ogp | (a-1)(b-1)(c-1) | MS_ogp = SS_ogp/df |
| Error | | SSE | abc(r-1) | MSE = SSE/df |

Each of the mean squares is a random quantity, which can be represented using a Chi-squared distribution. The expected value for each mean square is some combination of the true variances for each factor. For example, the expected value for MS_o according to Table 1 is $$bc\sigma_{Op}^2 + c\sigma_{Op*Ga}^2 + \sigma_{Op*Pa}^2 + \sigma_{Op*Ga*Pa}^2 + \sigma_{Error}^2$$

The method of moments estimate for the variance of an operator factor could then be computed as $$\hat{\sigma}_{Op}^2 = \frac{MS_o - MS_{og} - MS_{op} + MS_{ogp}}{bc}$$

Since the mean squares can be simulated using a known distribution, the computing system simulates values of these mean squares, computes the variances from these simulations, and then computes variance proportions and other metrics from the variances. The confidence intervals are generated by taking the appropriate percentiles from the simulations.

A user could be presented with a single measurement assessment, e.g., a primary diagnostic measure in proportion portion 1564 based on simulations and user-input to generate uncertainty intervals around the variance estimates and variance proportions. Additional metrics can be provide including EMP ("Evaluating the Measurement Process") categorization in EMP monitoring classification 1566 and probability of the response exceeding user-provided spec limits in specification portion 1568, both of which are assessments in measurement system analysis. Additionally, or alternatively, a single computer-generated likelihood could be presented (e.g., a single EMP monitoring classification like in this case second class for the most likely EMP monitoring classification). Users can interact with the one or more generated diagnostics by providing different prior estimates of variances to assess the properties of their design across a wide range of scenarios.

In one or more embodiments, a computing system evaluates the one or more computer-generated likelihoods for the respective candidate evaluations according to the measurement system analysis by simulating results for the simulation of the measurement system analysis and displaying in a graphical user interface one or more statistics or graphs related to the simulation. For example, as shown in FIG. 15D confidence intervals (CI) are provided for the computer-generated likelihoods for variance evaluations and specification limit failure probability evaluations (i.e., 95% CI lower and upper bounds). These CIs can be generated based on numerous or complex simulations (e.g., hundreds or thousands of simulations). By selecting the simulations results option 1570, a user can see a graph related to the simulation.

In this example, the graphical user interface 1560 can be used to estimate the level of certainty about an outcome, which is not known yet because the measurement system analysis has not been performed. This can be accomplished through simulations, which show individual predictions of the variance terms that may be indicated by the measurement system analysis. Thousands of measurement studies can be simulated by the computing system that reports back to the graphical user interface to display to the user what can be expected in terms of the variation in their responses. If the simulations indicate a wide range of estimates (e.g., a range of 0.0248 to 3.8448 for gauge in estimate portion 1562 of FIG. 15D), that could indicate to a user they may not have a lot of certainty in their estimates. However, if the range of estimates is tighter (e.g., a range of 0.3625 to 0.6551 for error in estimate portion 1562 of FIG. 15D), then the user can expect to be confident in their results.

Figure 15E:
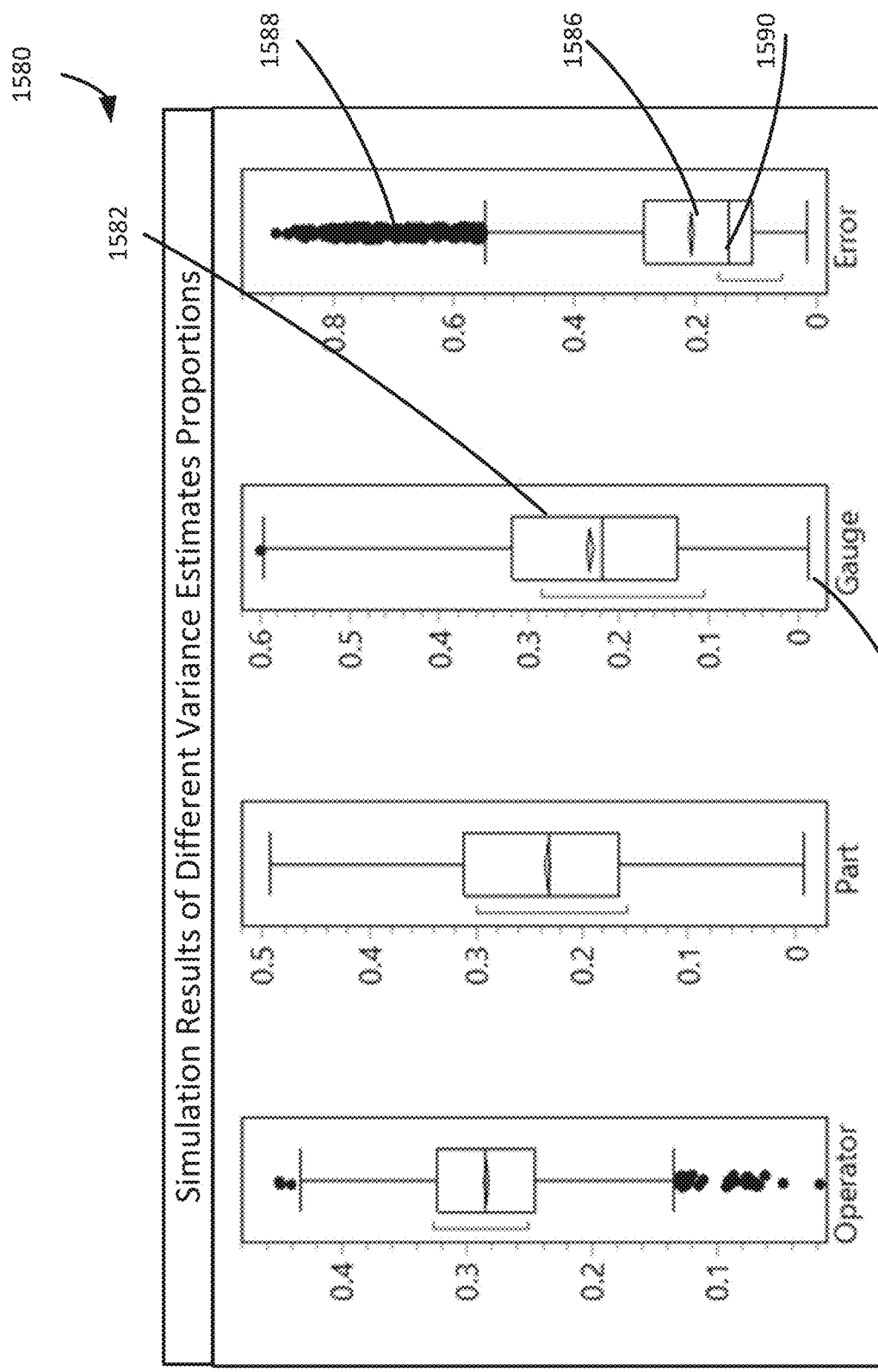
FIG. 15E illustrates an example graphical user interface for simulating a measurement system analysis according to at least one embodiment of the present technology.

FIG. 15E illustrates an example graphical user interface 1580 for simulating a measurement system analysis. The simulation results outline provides a boxplot of the simulation results of different candidate variance estimate proportions from the simulations. In this example, simulation results for different variance estimate proportions are shown for each of the operator, part, gauge, and error factors. A box (e.g., box 1582) is used to show the range in results from the first quartile (or 25$^{th}$ percentile) to the third quartile (or 75$^{th}$ percentile). A vertical line (e.g., line 1590) goes through the box at a medium of the results, whereas a diamond (e.g., diamond 1586) is used to show the average of simulation results. Whiskers (e.g., whisker 1584) are shown to represent the minimum and maximum of the interquartile range, with outliers shown as dotted points (e.g., points 1588) beyond the whiskers. A user could instead or additionally see summary statistics or export the results to a data table of the simulated values for further exploration.

FIGS. 15A-15E were merely examples. Interactive graphical user interfaces are shown and described herein. Graphical user interfaces could be displayed to a user separately as shown in FIGS. 15A-15E or differently (e.g., on the same display). Different models could have been used to generate output according to simulations. For example, nested models could be used both in design creation and diagnostic measures.

Figure 16A:
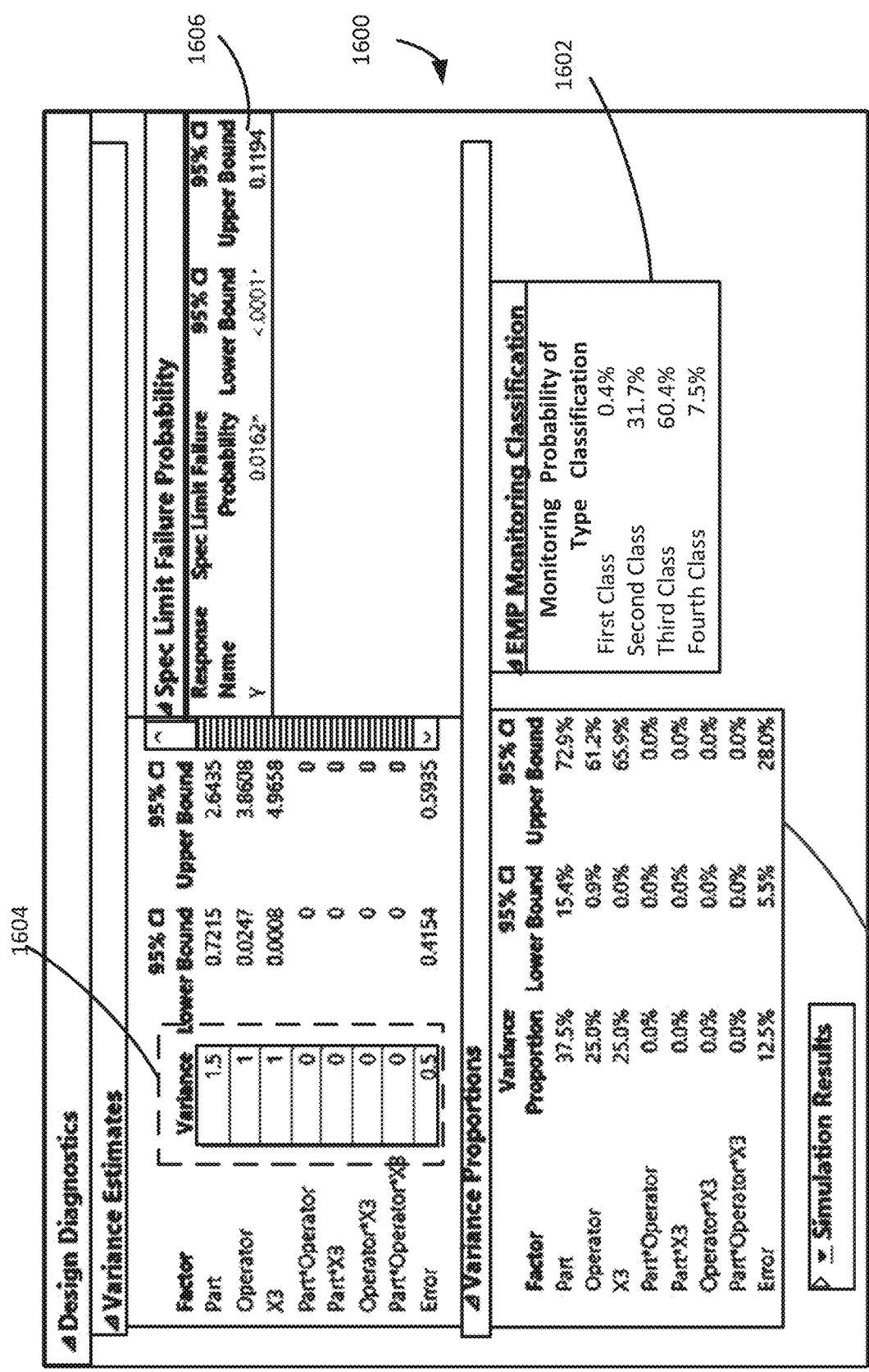

FIGS. 16A-16D illustrates an example comparison of computer-generated likelihoods to an outcome of a measurement system analysis. FIG. 16A shows the graphical user interface 1600 with computer-generated likelihoods for candidate evaluations (e.g., candidate EMP monitoring classifications 1602). EMP monitoring classifications indicate information regarding the measurement system such as classes defined by Donald Wheeler to classify how well the measurement process can identify the part-to-part variation. For instance, EMP monitoring classifications can indicate Intraclass Correlation values that indicate a proportion of the total variation attributable to the part. If there is very little measurement variation coming from the measurement process, this value would be close to 1. The EMP monitoring classes can indicate an amount of process signal attenuation (decrease) and the chance of detecting a 3 standard error shift within 10 subgroups, using Wheeler's test one or all four tests. Table 2 indicates an example table for correlating a monitoring class with various information regarding assessing a measurement process. An EMP classification is used only as an example. Different classifications could be used instead or different criteria for those monitoring classifications.

TABLE 2

| Monitoring Class | Interclass correlation coefficient | Reduction of Process Signal | Change of Detecting ± 3 Standard Error Shift |
| --- | --- | --- | --- |
| First Class | 0.8-1.0 | <10% | >99% with Rule 1 |
| Second Class | 0.5-0.8 | 10%-30% | >88% with Rule 1 |
| Third Class | 0.2-0.5 | 30%-55% | >91% with Rules 1, 2, 3, and 4 |
| Fourth Class | 0.0-0.2 | >55% | Rapidly Vanishing |

In this example, the computing system has received a request for one or more computer-generated likelihoods for candidate evaluations where the request indicates a metric set comprises multiple metrics shown in variance estimates table 1604. In this example, the multiple metrics indicate a first assumed variance ("1.5" for a part factor) for an operation of the industrial product set in the measurement system analysis. The multiple metrics indicate a second assumed variance ("1" for an operator factor) for an operator set comprising one or more operators measuring, in the measurement system analysis, at least one of the industrial product set. The multiple metrics indicate a third assumed variance for a blocking factor ("1" for an x3 factor) that is external to a measurement procedure but could have an influence on the measurement procedure, such as the location, day of the week, or time of day of a measurement test. A factor error can be used to account for variation not attributable to any source. In this case a variance of "0.5" has been assigned for error. The computing system can generate the input design for the measurement system analysis by including inputs for one or more measurement system analysis factors and blocking factors, and outputs the one or more computer-generated likelihoods for candidate evaluations accounting for an impact of the one or more measurement system analysis factors and blocking factors.

In one or more embodiments, the computing system outputs the one or more computer-generated likelihoods for candidate evaluations by determining an interclass correlation indicating a proportion of a total variation in operation of the industrial product set that is attributable to a member of the industrial product set, and generating, based on the interclass correlation, an EMP classification. For instance, graphical user interface 1600 shows EMP monitoring classifications 1602 indicating that if the measurement system analysis were conducted, that the measurement system would most likely be classified as a third class and is second most likely to be classified as a second-class monitoring type.

Other computer-generated likelihoods for candidate evaluations are displayed such as variance proportions in proportion portion 1608 and likelihood of failure to meet specification limits in specification portion 1606. For instance, proportion portion 1608 can quantify how much greater a variance proportion the part factor has to the total variation (37.5% with a 95% confidence interval of between 15.4% to 72.95%) given its greater assumed variance.

Figure 16B:
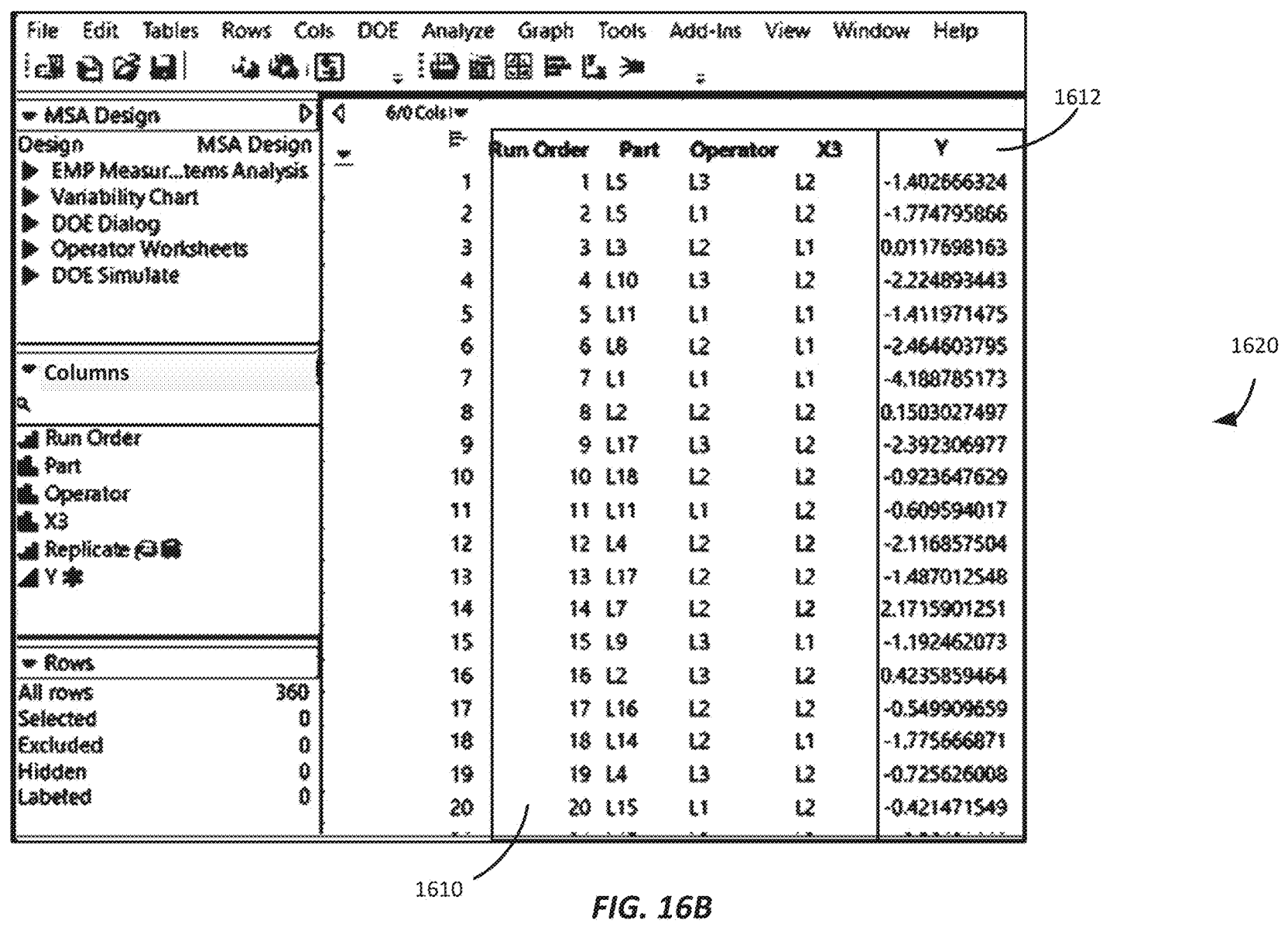

If the likelihoods for candidate evaluations seem acceptable to the user, the user can conduct the measurement system analysis. FIG. 16B shows a graphical user interface 1620 of an input design 1610 for the factors specified in FIG. 16A. The output 1612 of the measurement system tests according to the input design 1610 is also shown.

Figure 16C:
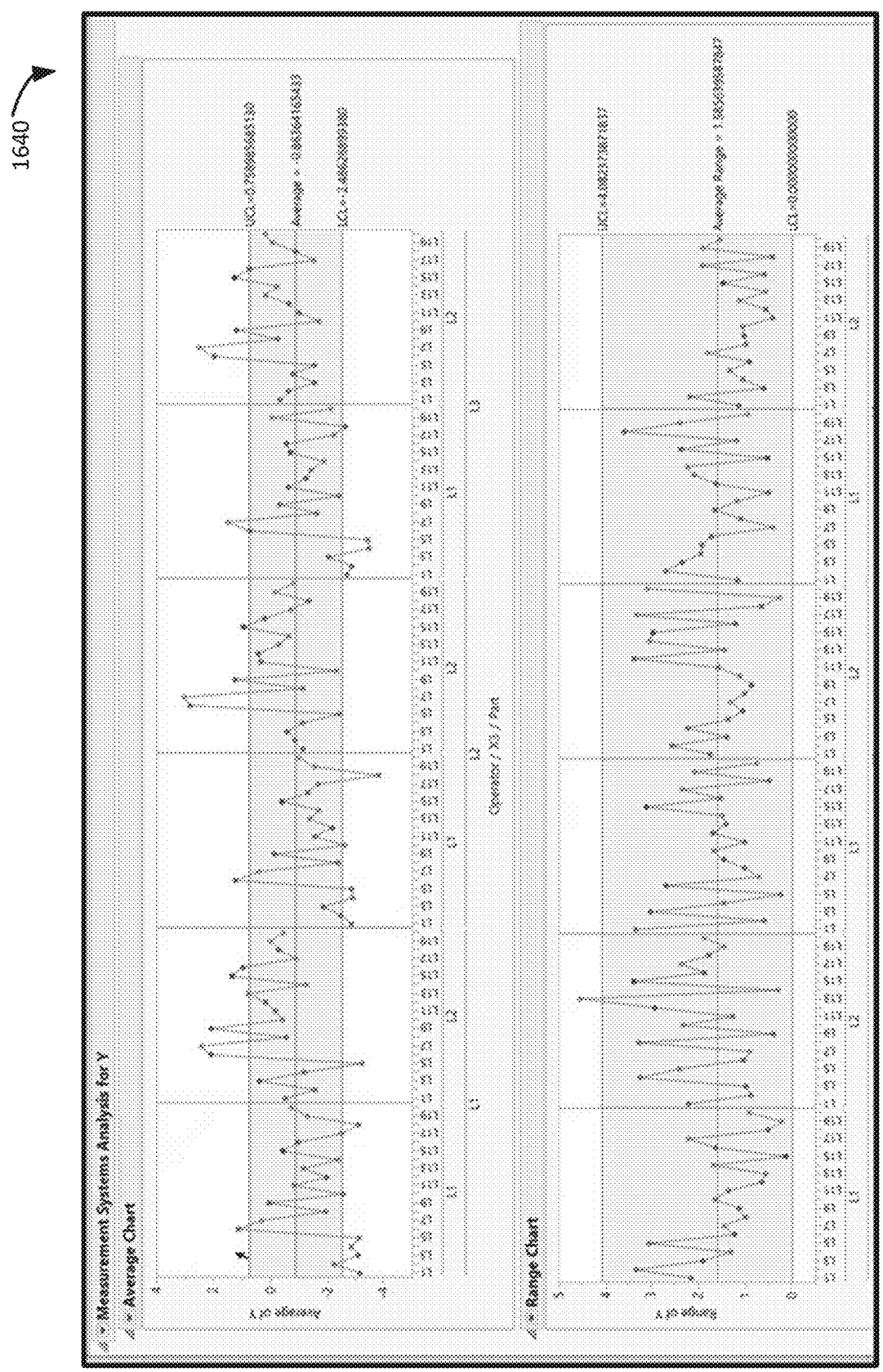

FIG. 16C shows a graphical user interface 1640 of plots of a measurement system analysis for the output 1612 with an average of output 1612 plotted for each of the different test scenarios and a range of the output 1612 plotted for each of the different test scenarios.

FIG. 16D shows a graphical user interface 1660 of the EMP results from the measurement system analysis. As shown in portion 1670 the system was classified as a third-class system (with bias) or (with bias and interaction between factors). This matches the estimated classification in FIG. 16A. Classification with bias takes bias factors such as from the operator and instrument into account when calculating an outcome for the EMP classification. It has a potential to be classified as second class with no bias from factors or interaction between factors. In this case bias is taken into account when computing the classification prior to the measurement system analysis.

In one or more embodiments, a computing system can receive an indication to include or exclude bias of a respective one of one or more factors in the measurement system analysis, and an interaction of multiple factors in the measurement system analysis. This indication could be indicated implicitly (e.g., by providing user defined variance to indicate to include bias) and not providing a predefined variance for a combination of factors such as Part*Operator to indicate not to include interaction between factors. One or more computer-generated likelihoods for candidate evaluations can then account for this indication of bias or interactions as indicated.

Figure 16E:
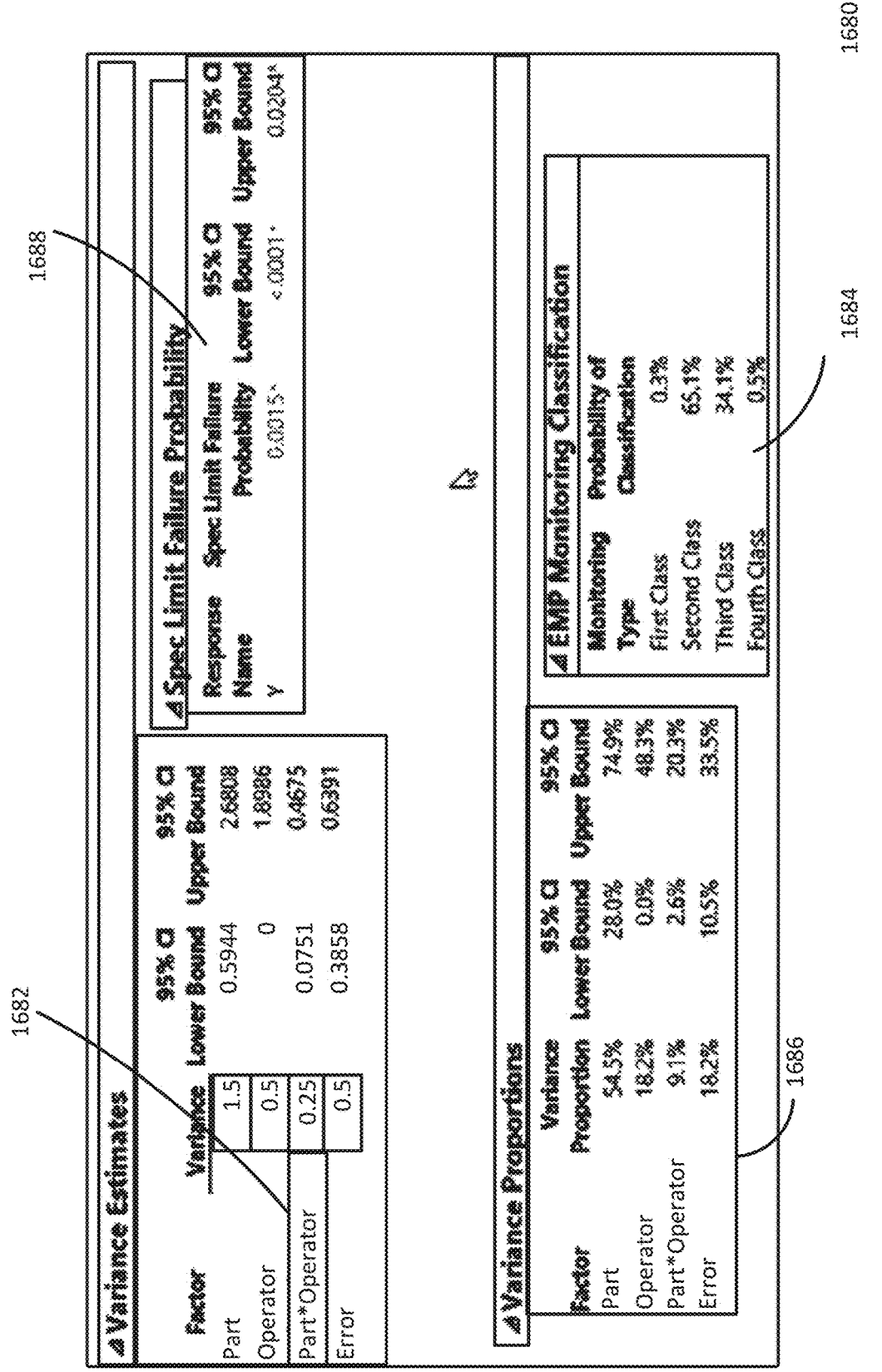
FIG. 16E illustrates an example graphical user interface for computing, accounting for an assumed variance for an interaction, a computer-generated likelihood for a candidate evaluation according to at least one embodiment of the present technology.

FIG. 16E illustrates an example graphical user interface 1680 for computing, accounting for an assumed variance for an interaction, a computer-generated likelihood for a candidate evaluation.

In this example, the user has entered a variance for the interaction factor 1682 of a part factor and operator factor ("part*operator" has a variance of "0.25"). An interaction variance may be estimated, for example, based on other measurement system tests or industry knowledge.

A computing system receives a user indication to include multiple factors in the measurement system analysis (e.g., part factor, operator factor, part*operator factor) and the metric set indicates an assumed variance for an interaction of one of more of the multiple factors in the measurement system analysis. The input design isolates the interaction of the one of more of the multiple factors in the measurement system analysis.

Graphical user interface 1680 shows an updated display of computer-generated likelihoods for candidate evaluations in view of these updated assumed variances. For instance, EMP monitoring classification 1684 indicates that the measurement system is now most likely to be classified as a second-class monitoring type. Variance portion 1686 indicates that most of the variance is coming from the part factor and specification portion 1688 indicates that there is a 0.0015 probability of a part failing the specification. Embodiments herein provide an interactive graphical user interface for users to test scenarios for different variances coming from factors of the measurement system or interaction of factors in the measurement system.

Figure 17A:
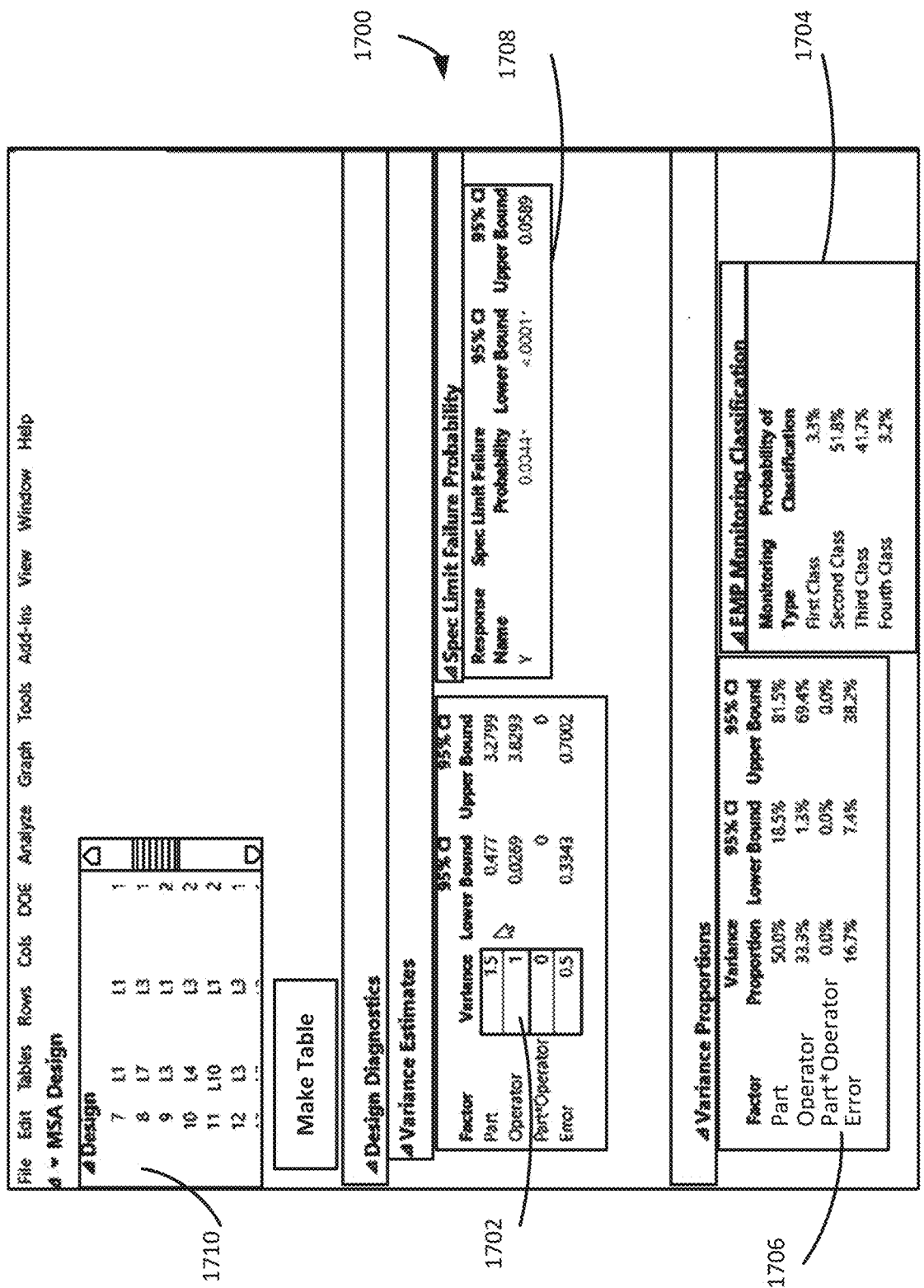

FIGS. 17A-17C illustrate example graphical user interfaces for changing variance estimates for updating a computer-generated likelihood for a candidate evaluation. In FIG. 17A, the graphical user interface 1700 shows various computer-generated likelihoods for input design 1710. The generated likelihoods account for assumed variance of "1.5" for a part factor, "1" for an operator variable, and "0.5" for an error factor as shown in estimates portion 1702. A confidence interval can be provided to indicate a confidence in the assumed or estimated variance. For instance, a 1.5 variance may be assumed for a part factor, but it is estimated by the computing system with 95% confidence that variance estimated to be observed in a measurement system analysis would fall between 0.477 to 3.2799 as displayed. A specification portion 1708 shows a likelihood for the measured part failing to meet specification limits (0.0044%) in specification portion 1708 of graphical user interface. The EMP monitoring classification 1704 shows the greatest likelihood of being classified as a second-class monitoring type, and most of the variance comes from the part as shown in proportion portion 1706 of graphical user interface 1700.

A user may test different scenarios to see how that would impact the likely classification. In FIG. 17B, the user increases the operator variance from "1" to "2" (e.g., accounting for less supervision or training of operators). Graphical user interface 1730 shows the updated values accounting for this change in variance. As shown in EMP monitoring classification 1734, this change could result in a likely downgrade to a third-class monitoring group. It would also increase the likelihood of the part failing to meet specifications as shown in specification portion 1738. The variance proportion estimates show a greater variation proportion coming from the operator now in proportion portion 1736.

In FIG. 17C, the user decreases the operator variance to "0.5" (e.g., accounting for greater supervision or training of operators). Graphical user interface 1760 shows the updated values accounting for this change in variance. As shown in EMP monitoring classification 1764, this change could result in a greater likelihood of classification into the second class. It would also decrease the likelihood of the part failing to meet specifications as shown in specification portion 1738, and the part would likely have the greatest influence on variation in proportion portion 1766. Accordingly, embodiments provide an interactive graphical user interface that allows users to test out scenarios before expending the cost and resources to conduct a measurement system analysis.

Previous examples assumed complete randomization of run order. One or more embodiments provide for restrictions in the randomization of run order in measurement system analysis designs. For instance, FIGS. 18A-18D illustrate example graphical user interfaces for user selection of the order of measurement tests in a measurement system analysis.

Figure 18A:
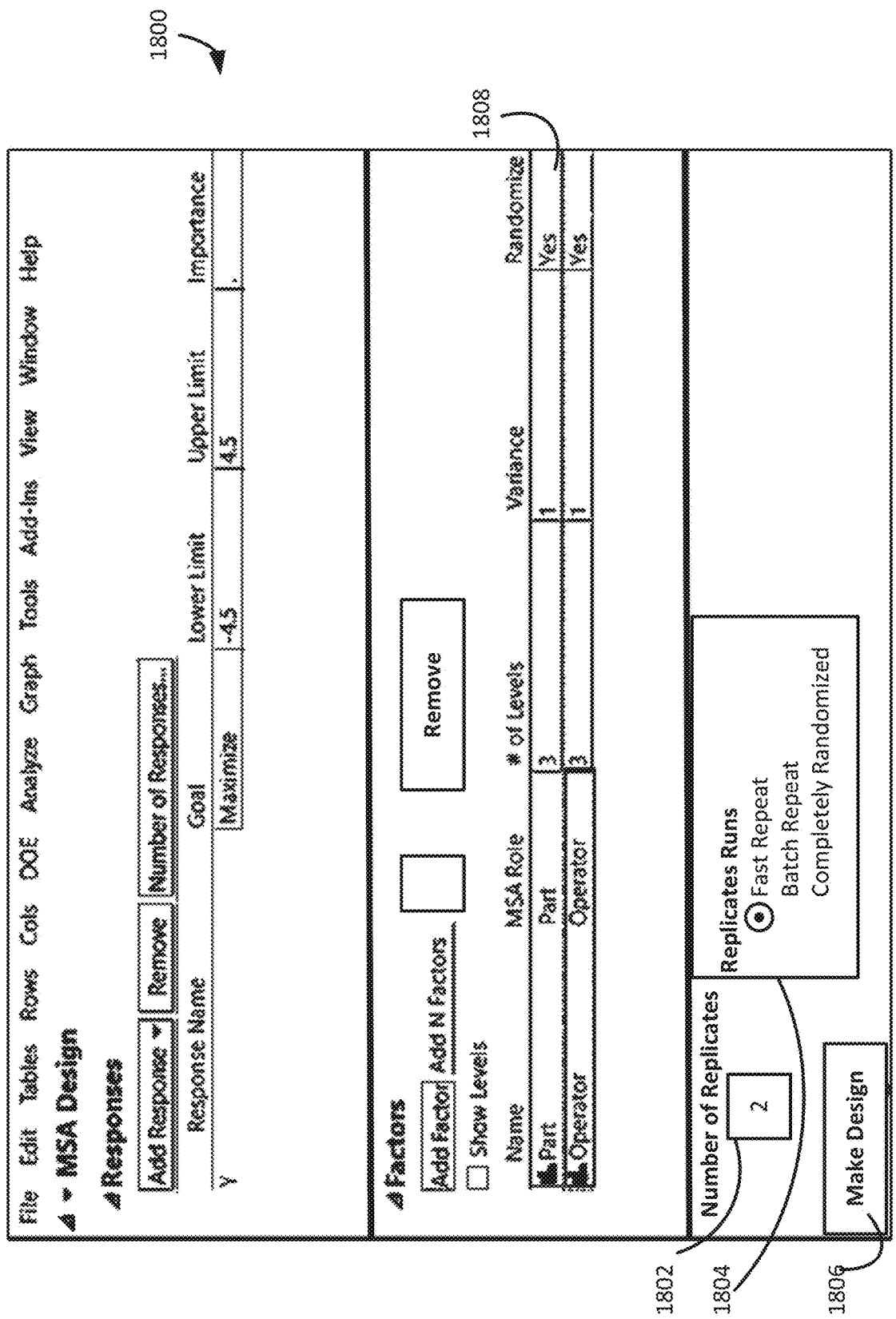
FIGS. 18A-18D illustrate example graphical user interfaces for user selection of an order of measurement tests in a measurement system analysis according to at least one embodiment of the present technology.

In one or more embodiments, replicates are controlled to restrict randomization. Replicates can be used to provide multiple measurement tests of similar conditions for different measurement studies of a measurement system analysis. For instance, a computing system can receive an indication of a restriction on generating an input design that restricts an ordering for the measurement tests in the measurement system analysis. The computing system can generate the input design based on the restriction to accommodate the ordering. For example, the graphical user interface 1800 in FIG. 18A is an interactive graphical user interface that allows a user to select a quantity of replicates in text box 1802 (e.g., 2 replicates). The graphical user interface 1800 also allows the user to make selections regarding the treatment of those replicates in measurement tests (i.e., runs). For instance, replicates control 1804 allows a user to select between a fast repeat, a batch repeat or completely randomized run order. In this example, a default is selected for a fast repeat run order. If the user selects design control 1806, an input design is generated that ensures a fast repeat of replicates in the run order.

The inputs for the factors in the different measurement studies or replicates is set to randomize in the specification of factors in table 1808. However, these factors can also be changed to have different characteristics as well. For instance, a factor could be fixed to be assigned only one type of level in a design. This would also restrict randomization in the design.

Figure 18B:
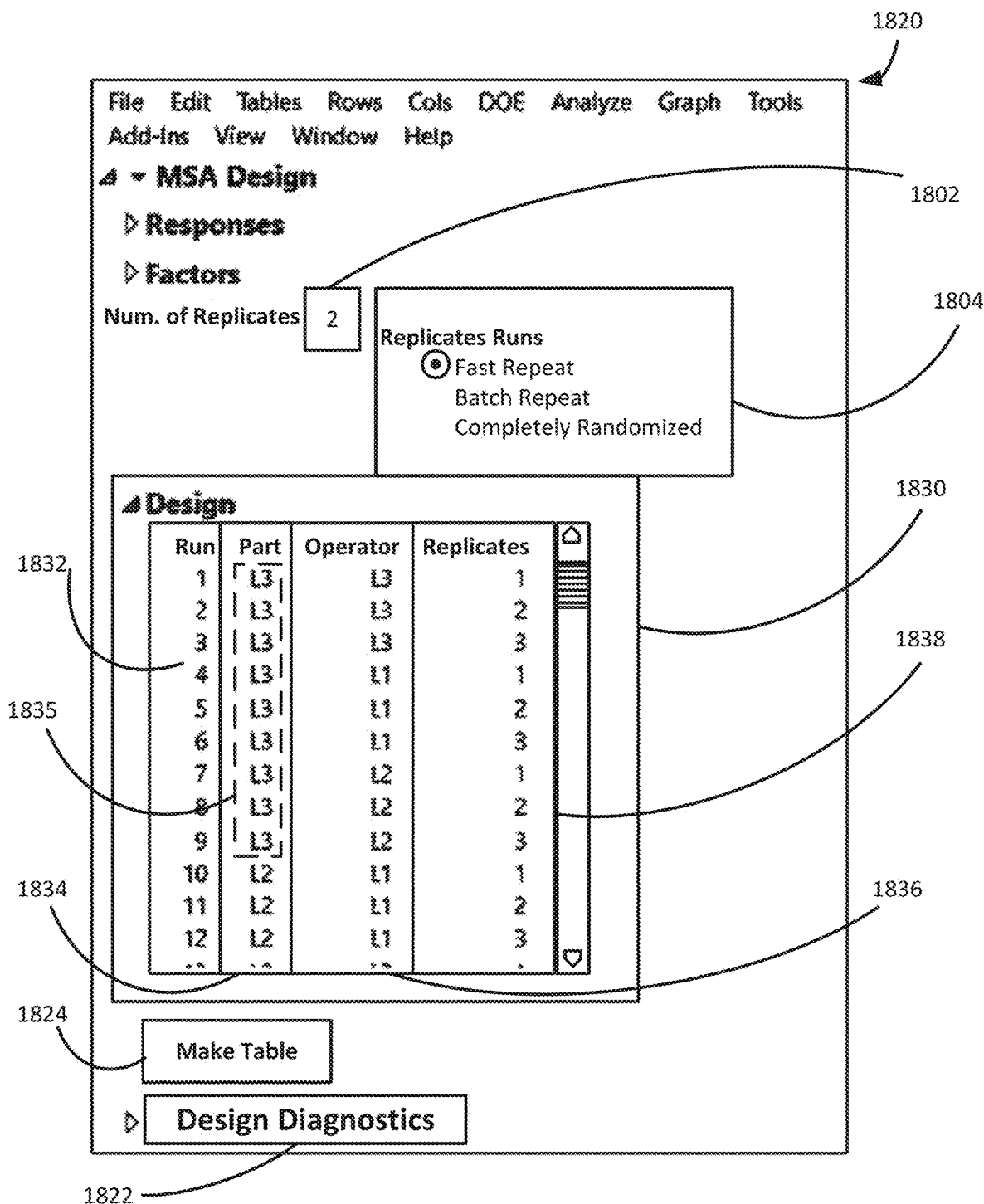

FIG. 18B shows a graphical user interface 1820 displaying the input design 1830. The graphical user interface 1820 indicates in proximity the restrictions on the input design 1830 made in graphical user interface 1800 (i.e., text box 1802 and replicates control 1804). In this example, fast repeat is selected for the run order. This is useful in situations in which for practical reasons it may be inefficient to switch out inputs for a factor going from one test to the next. It is useful in the design to have repeating inputs for a particular factor (i.e., in a groups of measurement tests).

In one or more embodiments, a user indication of a restriction may indicate to restrict the ordering to indicate an ordering for groups of the measurements tests for respective members of a component of the measurement system analyzed by the measurement system analysis (e.g., fast repeat run order). The computing system generates the input design to indicate the groups of the measurement tests for the respective members of the component of the measurement system. For instance, operators may be a component of a measurement system and they may do the tests in shifts (e.g., the first set of tests are conducted by the first operator and then the next operator comes in, etc.). It may be helpful to have measurement tests grouped by operator. In the example in FIG. 18B, parts are a component of a measurement system, and all the parts of a particular type are grouped together. For example, parts L3 are in a first group 1835 at the beginning of part column 1834 of the input design 1830. This can be useful, if for example, it is time consuming to switch out a part for each test. Runs column 1832 indicates the order of the measurement tests and operator column 1836 indicates the operator who will be testing the part. Replicates column 1838 can be used to indicate a measurement tests association with one of distinct studies according to the first measurement study and additional two replicates.

Table control 1824 can be used to generate a table of the input design 1830 (e.g., to print out to operators performing the measurement test according to the input design 1830).

If design diagnostic options 1822 are expanded, one or more computer-generated likelihoods for the respective candidate evaluations according to the measurement system analysis will display in graphical user interface 1820 as shown in other examples (e.g., an EMP classification likelihoods, variation proportion estimates, and likelihood of failure to meet specification). These generated likelihoods for candidate evaluations will be generated based on the design and based on the restrictions for the design. As with previous examples, the design diagnostic options 1822 can be explored prior to performing the measurement system analysis (e.g., to show computer-generated likelihoods for candidate evaluations described herein).

Figure 18C:
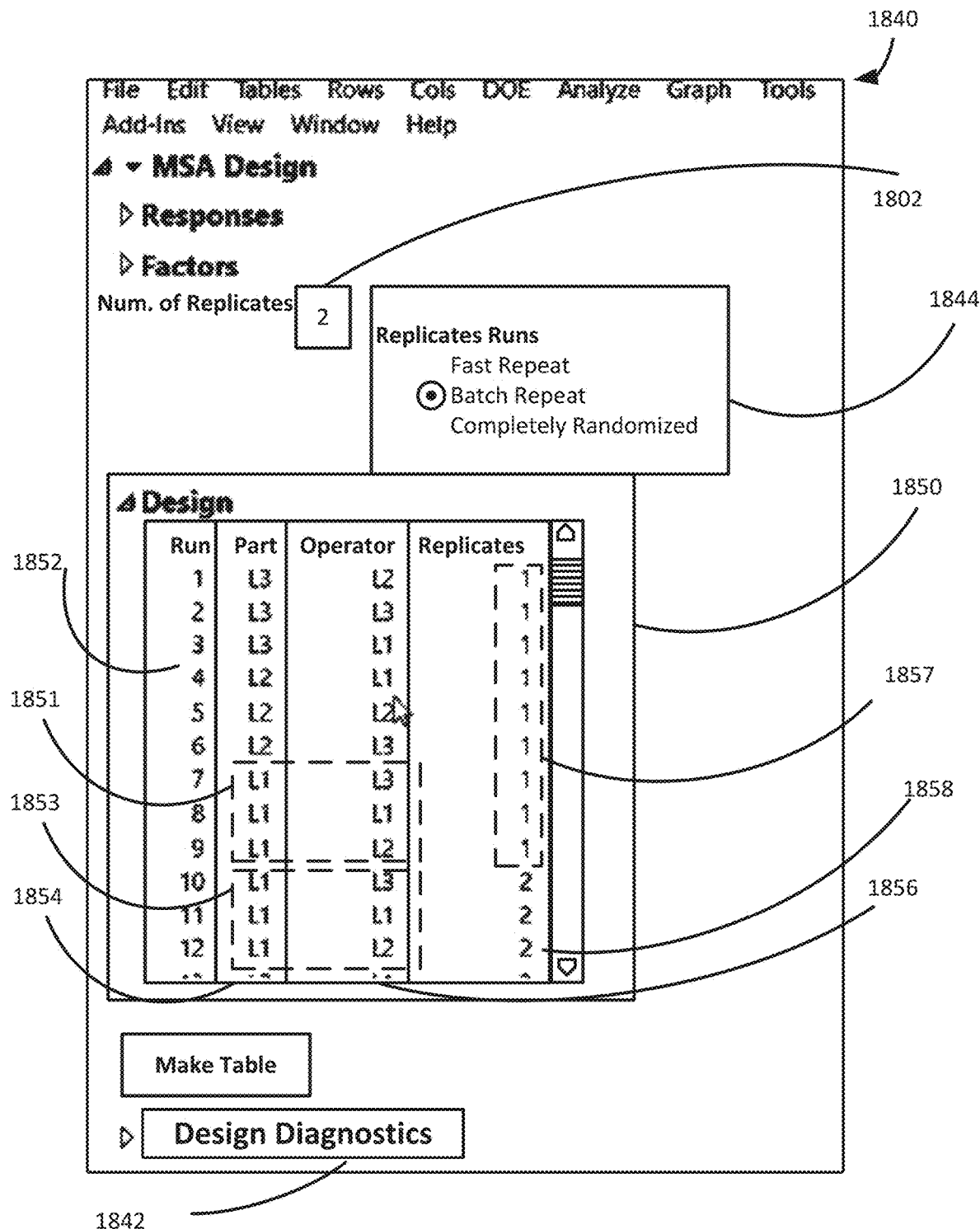

FIG. 18C shows a graphical user interface 1840 for the factors specified in FIG. 18A with a restriction in the replicates control 1844 for "batch repeat" run order. In the example, in FIG. 18C, the measurement system analysis comprises multiple studies with replicated test conditions in each of the multiple studies. The request to generate computer-generated likelihoods for candidate evaluations in this example indicates an amount of the multiple studies of the industrial product set for the measurement system analysis (e.g., a study and 2 replicates as indicated in text box 1802). The batch repeat run order is a user indication of a restriction to group measurement tests of a respective individual study of the multiple studies in an ordering for measurement tests. The computing system generates an input design to indicate groups of the measurement tests grouped in the respective individual study of the multiple studies. For instance, as shown in design 1850 of graphical user interface 1840, the replicates column 1858 has a grouping 1857 of measurement tests of a first measurement study ("1"). Similar test conditions can be found in each of the measurement study groups. For instance, part column 1854 and operator column 1856 specifies different part and operators for measurements tests identified in run column 1852. Test conditions 1851 for measurement study 1 match test conditions 1853 found in measurement study 2.

If design diagnostic options 1842 are expanded, one or more computer-generated likelihoods for the respective candidate evaluations according to the measurement system analysis will display in graphical user interface 1840 as shown in other examples (e.g., an EMP classification, variation proportion estimates, and likelihood of failure to meet specification). These generated likelihoods for candidate evaluations will be generated based on the design and based on the restrictions for the design. As with previous examples, the design diagnostic options 1842 can be explored prior to performing the measurement system analysis (e.g., to show computer-generated likelihoods for candidate evaluations described herein).

Figure 18D:
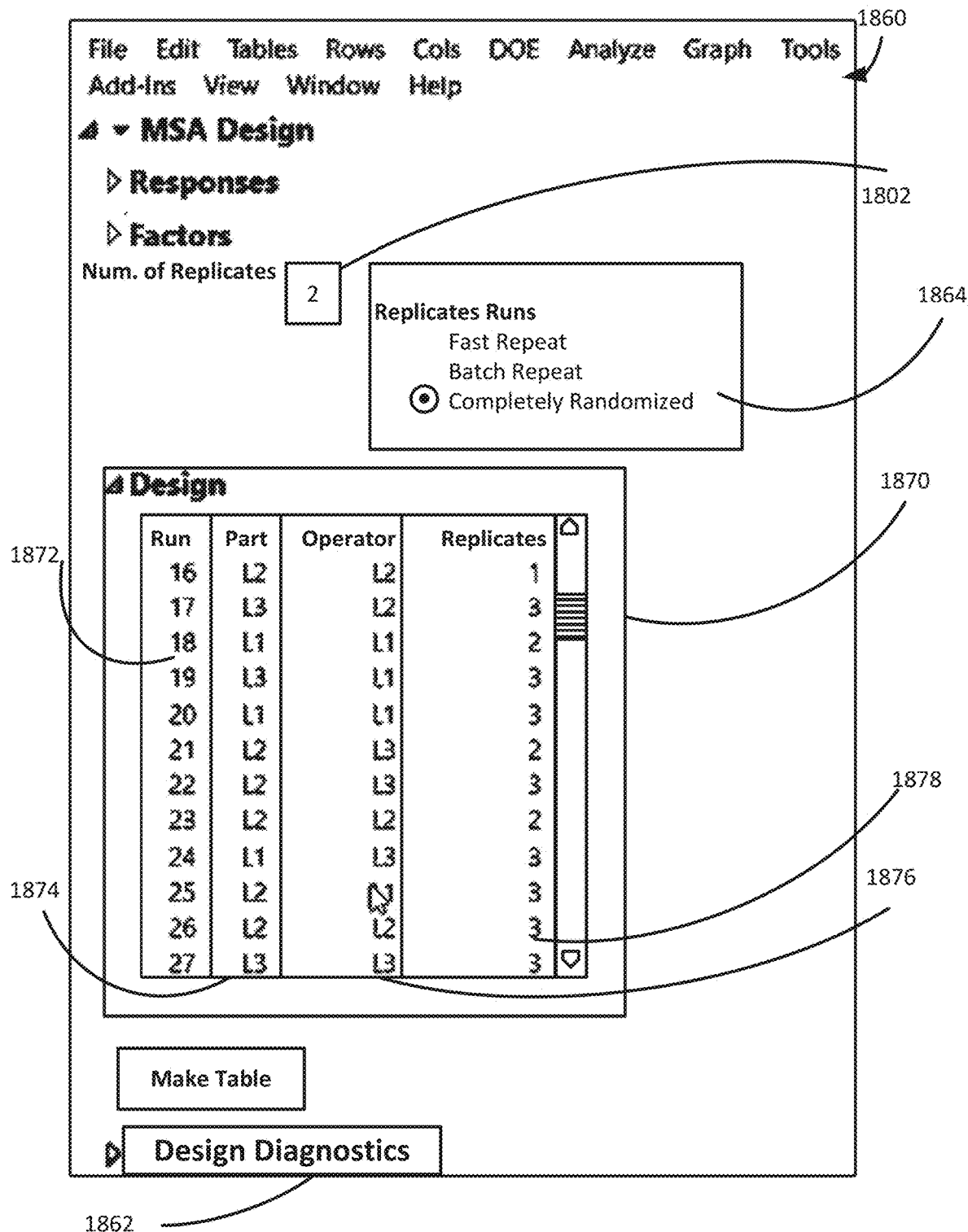

FIG. 18D shows a graphical user interface 1860 for the factors specified in FIG. 18A with a user specification for ordering in the replicates control 1864 for "completely randomized" run order. As shown in design 1870 of graphical user interface 1860, settings are varied for conditions in the parts column 1874, the operator column 1876 and the replicates column 1878 for the measurement tests identified in runs column 1872. This randomization contrasts with the similarities described in FIGS. 18B and 18C due to restrictions on assignment.

If design diagnostic options 1862 are expanded, one or more computer-generated likelihoods for the respective candidate evaluations according to the measurement system analysis will display in graphical user interface 1860 as shown in other examples (e.g., an EMP classification, variation proportion estimates, likelihood of failure to meet specification). These generated likelihoods for candidate evaluations will be generated based on the design and based on the restrictions for the design. As with previous examples, the design diagnostic options 1862 can be explored prior to performing the measurement system analysis (e.g., to show computer-generated likelihoods for candidate evaluations described herein).

In these examples in FIGS. 18A-18D, the measurement system analysis was for a non-destructive test for the industrial product set such that a member of the industrial product set is reused in testing according to the measurement system analysis. In this case, FIG. 18A specified 3 levels for a part factor for a sample size of 3 members. The computing system generated the input designs in FIGS. 18B-18D for these 3 members.

In some embodiments, the measurement system analysis is for a destructive test for an industrial product set such that a member of the industrial product set is destroyed in testing according to the measurement system analysis. For example, if an alkaline material with a certain ph tolerance is needed for forming a cleaner, the measurement test for measuring the ph of the alkaline material may alter the materials (e.g., change the color). Different samples may be needed for each measurement test. In this case a part factor may not be specified by a user or may be specified with the same number of levels as runs. A measurement system analysis involving a measurement procedure with a color variation may be very difficult to implement without variation (e.g., operators' eyesight are not identical, color gauges are not necessarily printed consistently, time of day may be a blocking factor impacting how the operator sees the color in the test). An input design for a measurement system analysis to consider an operator factor, a gauge factor, and a blocking factor may be needed.

Figure 19:
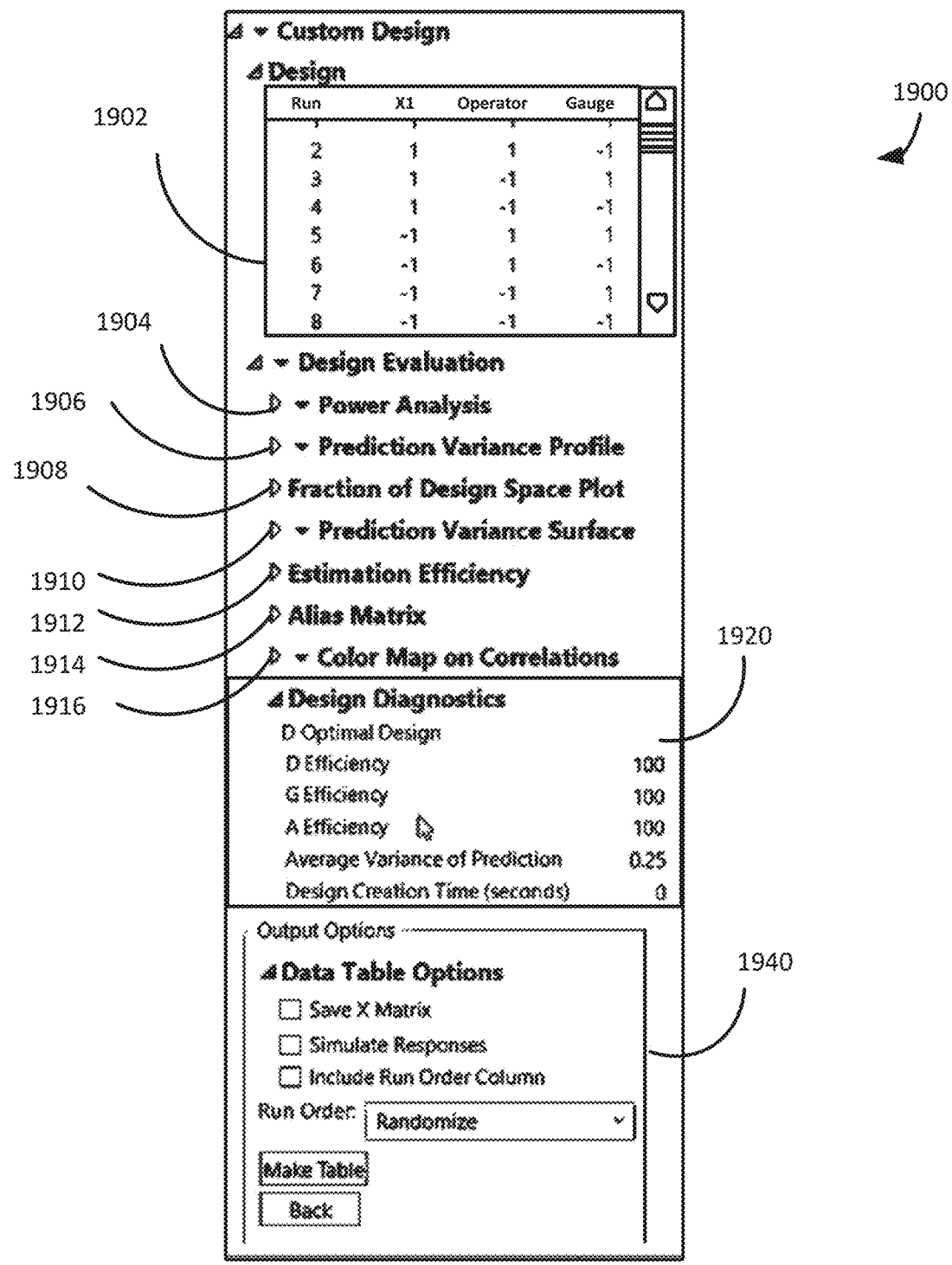
FIG. 19 illustrates an example graphical user interface for analyzing and outputting a design for a measurement system analysis according to at least one embodiment of the present technology.

The computing system can generate an input design for the measurement system analysis by generating respective conditions for testing each member of the industrial product set for multiple factors for the destructive test. For instance, FIG. 19 illustrates an example graphical user interface 1900 for analyzing and outputting a design for a measurement system analysis. FIG. 19 shows an input design 1902 in the graphical user interface 1900. In this example, there are three factors blocking factor ×12, operator, and gauge that can each take one of two levels (1 or −1). There is no part factor specified since each measurement test or run will have a different member of a same part type in the measurement system analysis. The input design indicates the respective conditions for other parts of the measurement system analysis. This is just one example implementation for computer-generated designs for destructive testing designs. There could be additional or alternative implementations such as an additional column uniquely identifying each part and/or an additional indicator for destructive testing.

Embodiments herein can be integrated with other design diagnostic tools for designs generated according to embodiments herein. For instance, one or more embodiments may be integrated into a Design of Experiments (DOE) platform in JMP® provided by SAS Institute Inc. in Cary, N.C. This can advantageously allow users to create designs specifically for the purpose of conducting a measurement system analysis and provide for design diagnostics specific to measurement system analysis goals and/or generally applicable to different design types.

For instance, the input design 1902 can be analyzed in a custom design tool. A power analysis 1904 can be used to study the probability of detecting a significant effect in a factor. For instance, there can be a fixed factor in the measurement system analysis which is not taken as a random subset of a population. For fixed factors, the bias due to each factor level is important and can be evaluated using the power analysis 1904. A prediction variance profile 1906 can be used to compute a relative prediction variance that depends on the design and factor settings and can be calculated before running the measurement system analysis. A smaller prediction variance is associated with a better design. A fraction of design space plot 1908 can be used to show the proportion of the design space over which the relative prediction variance lies where better designs have a larger proportion of the design space with low prediction variance values. A prediction variance surface 1910 shows a plot of the relative prediction variances for variables. An estimation efficiency 1912 can be used to give the fractional increase in confidence interval length and relative standard error of estimate for each parameter estimate in a model of the measurement system analysis. An alias matrix 1914 and color map on correlations 1916 can be used to evaluate relationships between factors of the measurement system analysis.

Design diagnostics 1920 can evaluate the input design according to different optimality criterion such as D-efficiency, G-efficiency, A-efficiency, average variance of prediction and design creation time. As shown designs can be created very quickly with good optimality properties (e.g., 100 efficiencies, 0 seconds to design creation). Output options can also be specified in output options control 1940 to change the output of the design (e.g., where a design is saved, how the runs are displayed, to simulate responses, etc.). These are merely examples of design diagnostics and evaluations that can be performed by a computing system. Those of skill in the art will appreciate other design diagnostic and evaluation tools for designs generated according to embodiments herein.

What is claimed is:

1. A computer-program product tangibly embodied in a non-transitory machine-readable storage medium, the computer-program product including instructions operable to cause a computing system to:
   prior to a measurement system analysis, receive a request for one or more computer-generated likelihoods for respective candidate evaluations of an industrial product set according to the measurement system analysis,
      wherein the measurement system analysis comprises measurement tests for evaluating, according to a measurement standard, the industrial product set comprising one or more industrial products;
      wherein each measurement test of the measurement tests has a respective setting for each member of a factor set comprising one or more factors of the measurement system analysis;
      wherein the request indicates a metric set representing one or more metrics each quantifying, prior to the measurement system analysis, an estimate of contribution to variation in evaluating the industrial product set according to the measurement system analysis; and
      wherein the one or more computer-generated likelihoods for the respective candidate evaluations of the industrial product set comprise one or more of:
         a likelihood of classification into one of multiple groups for the industrial product set according to the measurement standard; and
         a likelihood of going beyond a threshold related to the measurement standard;
   prior to the measurement system analysis, generate an input design comprising a respective input set for each respective measurement test of the measurement system analysis,
      wherein the respective input set comprises one or more settings for conducting the respective measurement test of the measurement system analysis; and
      wherein the input design is designed to isolate candidate sources for contributing to the variation in evaluating the industrial product set according to the measurement system analysis; and
   prior to the measurement system analysis, output, based on the metric set and the input design, the one or more computer-generated likelihoods for the respective candidate evaluations of the industrial product set according to the measurement system analysis.

2. The computer-program product of claim 1, wherein the instructions are operable to cause the computing system to output the one or more computer-generated likelihoods for the respective candidate evaluations of the industrial product set by:
   determining an interclass correlation indicating a proportion of a total variation in operation of the industrial product set that is attributable to a member of the industrial product set; and
   generating, based on the interclass correlation, an Evaluating the Measurement Process (EMP) classification.

3. The computer-program product of claim 1,
   wherein the instructions are operable to cause the computing system to further receive a user indication to include multiple factors in the measurement system analysis;
   wherein the metric set indicates an assumed variance for an interaction of one of more of the multiple factors in the measurement system analysis; and
   wherein the input design isolates the interaction of the one of more of the multiple factors in the measurement system analysis.

4. The computer-program product of claim 1, wherein the instructions are operable to cause the computing system to:
   further receive a user indication of a restriction on generating the input design that restricts an ordering for the measurement tests in the measurement system analysis;
   generate the input design based on the restriction to accommodate the ordering; and
   output, based on the restriction, the one or more computer-generated likelihoods for the respective candidate evaluations of the industrial product set according to the measurement system analysis.

5. The computer-program product of claim 4,
   wherein the user indication of the restriction indicates to restrict the ordering to indicate an ordering for groups of the measurements tests for respective members of a component of a measurement system analyzed by the measurement system analysis; and
   wherein the instructions are operable to cause the computing system to generate the input design to indicate the groups of the measurement tests for the respective members of the component of the measurement system.

6. The computer-program product of claim 1,
wherein the measurement system analysis comprises multiple studies with replicated test conditions in each of the multiple studies;
wherein the request further indicates an amount of the multiple studies of the industrial product set for the measurement system analysis;
wherein the user indication of the restriction indicates a restriction to group measurement tests of a respective individual study of the multiple studies in the ordering; and
wherein the instructions are operable to cause the computing system to generate the input design to indicate groups of the measurement tests grouped in the respective individual study of the multiple studies.

7. The computer-program product of claim 1, wherein the instructions are operable to cause the computing system to:
generate the input design for the measurement system analysis by including inputs for one or more blocking factors that are external to a measurement procedure according to the measurement system analysis; and
output, accounting for an impact of the one or more blocking factors, the one or more computer-generated likelihoods for the respective candidate evaluations of the industrial product set.

8. A computer-program product tangibly embodied in a non-transitory machine-readable storage medium, the computer-program product including instructions operable to cause a computing system to:
prior to a measurement system analysis, receive a request for one or more computer-generated likelihoods for respective candidate evaluations of an industrial product set according to the measurement system analysis,
wherein the measurement system analysis comprises measurement tests for evaluating, according to a measurement standard, the industrial product set comprising one or more industrial products;
wherein each measurement test of the measurement tests has a respective setting for each member of a factor set comprising one or more factors of the measurement system analysis; and
wherein the request indicates a metric set representing one or more metrics each quantifying, prior to the measurement system analysis, an estimate of contribution to variation in evaluating the industrial product set according to the measurement system analysis;
prior to the measurement system analysis, generate an input design comprising a respective input set for each respective measurement test of the measurement system analysis,
wherein the respective input set comprises one or more settings for conducting the respective measurement test of the measurement system analysis; and
wherein the input design is designed to isolate candidate sources for contributing to the variation in evaluating the industrial product set according to the measurement system analysis;
receive an indication from a user to include or exclude one or more of:
bias of a respective one of multiple factors in the measurement system analysis; and
interaction of multiple factors in the measurement system analysis; and
prior to the measurement system analysis, output, accounting for the metric set, the input design, and the indication, the one or more computer-generated likelihoods for the respective candidate evaluations of the industrial product set according to the measurement system analysis.

9. A computer-program product tangibly embodied in a non-transitory machine-readable storage medium, the computer-program product including instructions operable to cause a computing system to:
prior to a measurement system analysis, receive a request for one or more computer-generated likelihoods for respective candidate evaluations of an industrial product set according to the measurement system analysis,
wherein the measurement system analysis comprises measurement tests for evaluating, according to a measurement standard, the industrial product set comprising one or more industrial products;
wherein each measurement test of the measurement tests has a respective setting for each member of a factor set comprising one or more factors of the measurement system analysis; and
wherein the request indicates a metric set representing one or more metrics each quantifying, prior to the measurement system analysis, an estimate of contribution to variation in evaluating the industrial product set according to the measurement system analysis;
prior to the measurement system analysis, generate an input design comprising a respective input set for each respective measurement test of the measurement system analysis,
wherein the respective input set comprises one or more settings for conducting the respective measurement test of the measurement system analysis; and
wherein the input design is designed to isolate candidate sources for contributing to the variation in evaluating the industrial product set according to the measurement system analysis; and
prior to the measurement system analysis, output, based on the metric set and the input design, the one or more computer-generated likelihoods for the respective candidate evaluations of the industrial product set according to the measurement system analysis by displaying in a graphical user interface an initial output for the one or more computer-generated likelihoods for the respective candidate evaluations of the industrial product set and the metric set;
receive a user indication to change one or more metrics of the metric set; and
update the graphical user interface to display an updated output for the one or more computer-generated likelihoods for the respective candidate evaluations of the industrial product set, wherein the updated output accounts for the user indication.

10. A computer-program product tangibly embodied in a non-transitory machine-readable storage medium, the computer-program product including instructions operable to cause a computing system to:
prior to a measurement system analysis, receive a request for one or more computer-generated likelihoods for respective candidate evaluations of an industrial product set according to the measurement system analysis,
wherein the measurement system analysis comprises measurement tests for evaluating, according to a measurement standard, the industrial product set comprising one or more industrial products;
wherein each measurement test of the measurement tests has a respective setting for each member of a factor set comprising one or more factors of the measurement system analysis; and
wherein the request indicates a metric set representing one or more metrics each quantifying, prior to the measurement system analysis, an estimate of contribution to variation in evaluating the industrial product set according to the measurement system analysis;
prior to the measurement system analysis, generate an input design comprising a respective input set for each respective measurement test of the measurement system analysis,
wherein the respective input set comprises one or more settings for conducting the respective measurement test of the measurement system analysis; and
wherein the input design is designed to isolate candidate sources for contributing to the variation in evaluating the industrial product set according to the measurement system analysis;
prior to the measurement system analysis, output, based on the metric set and the input design, the one or more computer-generated likelihoods for the respective candidate evaluations of the industrial product set according to the measurement system analysis; and
evaluate the one or more computer-generated likelihoods for the respective candidate evaluations of the industrial product set according to the measurement system analysis by:
simulating results for the simulation of the measurement system analysis; and
displaying in a graphical user interface one or more statistics or graphs related to the simulation.

11. A computer-program product tangibly embodied in a non-transitory machine-readable storage medium, the computer-program product including instructions operable to cause a computing system to:
prior to a measurement system analysis, receive a request for one or more computer-generated likelihoods for respective candidate evaluations of an industrial product set according to the measurement system analysis,
wherein the measurement system analysis comprises measurement tests for evaluating, according to a measurement standard, the industrial product set comprising one or more industrial products;
wherein each measurement test of the measurement tests has a respective setting for each member of a factor set comprising one or more factors of the measurement system analysis;
wherein the request indicates a metric set representing one or more metrics each quantifying, prior to the measurement system analysis, an estimate of contribution to variation in evaluating the industrial product set according to the measurement system analysis; and
wherein the metric set comprises one or more of:
an assumed variance for an operator set comprising one or more operators measuring, in the measurement system analysis, at least one of the industrial product set;
an assumed variance for a tool set comprising one or more measurement tools for measuring, in the measurement system analysis, at least one member of the industrial product set; and
an assumed variance for operation of the industrial product set in the measurement system analysis;
prior to the measurement system analysis, generate an input design comprising a respective input set for each respective measurement test of the measurement system analysis,
wherein the respective input set comprises one or more settings for conducting the respective measurement test of the measurement system analysis; and
wherein the input design is designed to isolate candidate sources for contributing to the variation in evaluating the industrial product set according to the measurement system analysis;
prior to the measurement system analysis, output, based on the metric set and the input design, the one or more computer-generated likelihoods for the respective candidate evaluations of the industrial product set according to the measurement system analysis.

12. The computer-program product of claim 11, wherein the instructions are operable to cause the computing system to output the one or more computer-generated likelihoods for the respective candidate evaluations of the industrial product set by displaying in a graphical user interface estimate statistics for:
proportion of the variation attributable to the operator set;
proportion of the variation attributable to the tool set; and
proportion of the variation attributable to the operation of the industrial product set.

13. The computer-program product of claim 11, wherein the instructions are operable to cause the computing system to:
further receive a user indication to include an operator factor in the measurement system analysis indicating multiple operator characteristics in the operator set, wherein the metric set indicates the assumed variance for the operator set; and
generate the input design by generating respective inputs associated with each of multiple operator characteristics of the operator set in the measurement system analysis; and
output, accounting for the assumed variance for the operator set, the one or more computer-generated likelihoods for the respective candidate evaluations of the industrial product set.

14. The computer-program product of claim 11, wherein the instructions are operable to cause the computing system to:
further receive a user indication to include a gauge factor in the measurement system analysis indicating multiple measurement tools of the tool set, wherein the metric set indicates the assumed variance for the tool set;
generate the input design by generating respective inputs associated with each of multiple measurement tools in the measurement system analysis; and
output, accounting for the assumed variance for the tool set, the one or more computer-generated likelihoods for the respective candidate evaluations of the industrial product set.

15. The computer-program product of claim 11, wherein the instructions are operable to cause the computing system to:
further receive a user indication to include a part factor in the measurement system analysis indicating multiple industrial products of a same type in the industrial product set, wherein the metric set indicates the assumed variance for the operation of the industrial product set;

generate the input design by generating respective inputs associated with each of multiple industrial products of the industrial product set in the measurement system analysis; and output, accounting for the assumed variance for the industrial product set, the one or more computer-generated likelihoods for the respective candidate evaluations of the industrial product set.

16. The computer-program product of claim 11,
wherein the metric set comprises multiple metrics;
wherein a respective one of the multiple metrics indicates:
   a first assumed variance for the operator set;
   a second assumed variance for the tool set; and
   a third assumed variance for the operation of the industrial product set in the measurement system analysis; and
wherein the instructions are operable to cause the computing system to output, accounting for the first assumed variance, the second assumed variance, and the third assumed variance, one or more computer-generated likelihoods for the respective candidate evaluations of the industrial product set.

17. A computer-program product tangibly embodied in a non-transitory machine-readable storage medium, the computer-program product including instructions operable to cause a computing system to:
   prior to a measurement system analysis, receive a request for one or more computer-generated likelihoods for respective candidate evaluations of an industrial product set according to the measurement system analysis,
      wherein the measurement system analysis comprises measurement tests for evaluating, according to a measurement standard, the industrial product set comprising one or more industrial products;
      wherein each measurement test of the measurement tests has a respective setting for each member of a factor set comprising one or more factors of the measurement system analysis;
      wherein the request indicates a metric set representing one or more metrics each quantifying, prior to the measurement system analysis, an estimate of contribution to variation in evaluating the industrial product set according to the measurement system analysis; and
      wherein the measurement system analysis is:
         a destructive test for the industrial product set such that a member of the industrial product set is destroyed in testing according to the measurement system analysis; or
         a non-destructive test for the industrial product set such that a member of the industrial product set is reused in testing according to the measurement system analysis;
   prior to the measurement system analysis, generate an input design comprising a respective input set for each respective measurement test of the measurement system analysis by generating respective conditions for testing each member of the industrial product set for multiple factors for the measurement system analysis,
      wherein the respective input set comprises one or more settings for conducting the respective measurement test of the measurement system analysis;
      wherein the input design is designed to isolate candidate sources for contributing to the variation in evaluating the industrial product set according to the measurement system analysis; and
      wherein the input design indicates the respective conditions; and
   prior to the measurement system analysis, output, based on the metric set and the input design, the one or more computer-generated likelihoods for the respective candidate evaluations of the industrial product set according to the measurement system analysis.

18. The computer-program product of claim 17,
wherein the measurement system analysis is the non-destructive test for the industrial product set such that the member of the industrial product set is reused in testing according to the measurement system analysis;
wherein the request indicates an amount of reuse of members of the industrial product set for testing; and
wherein the input design comprises at least two different sets of conditions for each member of the industrial product set.

19. A computer-implemented method comprising:
   prior to a measurement system analysis, receiving a request for one or more computer-generated likelihoods for respective candidate evaluations of an industrial product set according to the measurement system analysis,
      wherein the measurement system analysis comprises measurement tests for evaluating, according to a measurement standard, the industrial product set comprising one or more industrial products;
      wherein each measurement test of the measurement tests has a respective setting for each member of a factor set comprising one or more factors of the measurement system analysis;
      wherein the request indicates a metric set representing one or more metrics each quantifying, prior to the measurement system analysis, an estimate of contribution to variation in evaluating the industrial product set according to the measurement system analysis; and
      wherein the one or more computer-generated likelihoods for the respective candidate evaluations of the industrial product set comprise one or more of:
         a likelihood of classification into one of multiple groups for the industrial product set according to the measurement standard; and
         a likelihood of going beyond a threshold related to the measurement standard;
   prior to the measurement system analysis, generating an input design comprising a respective input set for each respective measurement test of the measurement system analysis,
      wherein the respective input set comprises one or more settings for conducting the respective measurement test of the measurement system analysis; and
      wherein the input design is designed to isolate candidate sources for contributing to the variation in evaluating the industrial product set according to the measurement system analysis; and
   prior to the measurement system analysis, outputting, based on the metric set and the input design, the one or more computer-generated likelihoods for the respective candidate evaluations of the industrial product set according to the measurement system analysis.

20. The computer-implemented method of claim 19, wherein the outputting the one or more computer-generated likelihoods for the respective candidate evaluations of the industrial product set comprises:

determining an interclass correlation indicating a proportion of a total variation in operation of the industrial product set that is attributable to a member of the industrial product set; and generating, based on the interclass correlation, an Evaluating the Measurement Process (EMP) classification.

21. The computer-implemented method of claim 19, wherein the outputting the one or more computer-generated likelihoods for the respective candidate evaluations of the industrial product set comprises displaying in a graphical user interface an initial output for the one or more computer-generated likelihoods for the respective candidate evaluations of the industrial product set and the metric set;

wherein the computer-implemented method further comprises:

receiving a user indication to change one or more metrics of the metric set; and updating the graphical user interface to display an updated output for the one or more computer-generated likelihoods for the respective candidate evaluations of the industrial product set, wherein the updated output accounts for the user indication.

22. The computer-implemented method of claim 19, wherein the computer-implemented method further comprises evaluating the one or more computer-generated likelihoods for the respective candidate evaluations of the industrial product set according to the measurement system analysis by:

simulating results for the simulation of the measurement system analysis; and displaying in a graphical user interface one or more statistics or graphs related to the simulation.

23. The computer-implemented method of claim 19, wherein the metric set comprises one or more of:

an assumed variance for an operator set comprising one or more operators measuring, in the measurement system analysis, at least one of the industrial product set;

an assumed variance for a tool set comprising one or more measurement tools for measuring, in the measurement system analysis, at least one member of the industrial product set; and an assumed variance for operation of the industrial product set in the measurement system analysis.

24. The computer-implemented method of claim 19, wherein the computer-implemented method further comprises receiving a user indication to include an operator factor in the measurement system analysis indicating multiple operator characteristics in an operator set, wherein the metric set indicates an assumed variance for the operator set comprising one or more operators measuring, in the measurement system analysis, at least one of the industrial product set; and wherein the generating the input design comprises generating respective inputs associated with each of multiple operator characteristics of the operator set in the measurement system analysis; and wherein the outputting the one or more computer-generated likelihoods for the respective candidate evaluations of the industrial product set comprises outputting, accounting for the assumed variance for the operator set, the one or more computer-generated likelihoods for the respective candidate evaluations of the industrial product set.

25. The computer-implemented method of claim 19, wherein the computer-implemented method further comprises receiving a user indication to include a gauge factor in the measurement system analysis indicating multiple measurement tools of a tool set, wherein the metric set indicates an assumed variance for the tool set comprising one or more measurement tools for measuring, in the measurement system analysis, at least one member of the industrial product set;

wherein the generating the input design comprises generating respective inputs associated with each of multiple measurement tools in the measurement system analysis; and wherein the outputting the one or more computer-generated likelihoods for the respective candidate evaluations of the industrial product set comprises outputting, accounting for the assumed variance for the tool set, the one or more computer-generated likelihoods for the respective candidate evaluations of the industrial product set.

26. The computer-implemented method of claim 19, wherein the computer-implemented method further comprises receiving a user indication to include a part factor in the measurement system analysis indicating multiple industrial products of a same type in the industrial product set, wherein the metric set indicates an assumed variance for the industrial product set;

wherein the generating the input design comprises generating respective inputs associated with each of multiple industrial products of the industrial product set in the measurement system analysis; and wherein the outputting the one or more computer-generated likelihoods comprises for the respective candidate evaluations of the industrial product set outputting, accounting for the assumed variance for the industrial product set, the one or more computer-generated likelihoods for the respective candidate evaluations of the industrial product set.

27. The computer-implemented method of claim 19, wherein the computer-implemented method further comprises receiving a user indication of a restriction on generating the input design that restricts an ordering for the measurement tests in the measurement system analysis;

wherein the generating the input design comprises generating the input design based on the restriction to accommodate the ordering; and wherein the outputting the one or more computer-generated likelihoods for the respective candidate evaluations of the industrial product set comprises outputting, based on the restriction, the one or more computer-generated likelihoods for the respective candidate evaluations of the industrial product set according to the measurement system analysis.

28. A computing device comprising processor and memory, the memory containing instructions executable by the processor wherein the computing device is configured to:

prior to a measurement system analysis, receive a request for one or more computer-generated likelihoods for respective candidate evaluations of an industrial product set according to the measurement system analysis, wherein the measurement system analysis comprises measurement tests for evaluating, according to a measurement standard, the industrial product set comprising one or more industrial products;

wherein each measurement test of the measurement tests has a respective setting for each member of a factor set comprising one or more factors of the measurement system analysis;

wherein the request indicates a metric set representing one or more metrics each quantifying, prior to the measurement system analysis, an estimate of contribution to variation in evaluating the industrial product set according to the measurement system analysis; and wherein the one or more computer-generated likelihoods for the respective candidate evaluations of the industrial product set comprise one or more of:
- a likelihood of classification into one of multiple groups for the industrial product set according to the measurement standard; and
- a likelihood of going beyond a threshold related to the measurement standard;

prior to the measurement system analysis, generate an input design comprising a respective input set for each respective measurement test of the measurement system analysis, wherein the respective input set comprises one or more settings for conducting the respective measurement test of the measurement system analysis; and wherein the input design is designed to isolate candidate sources for contributing to the variation in evaluating the industrial product set according to the measurement system analysis; and prior to the measurement system analysis, output, based on the metric set and the input design, the one or more computer-generated likelihoods for the respective candidate evaluations of the industrial product set according to the measurement system analysis.

* * * * *

UNITED STATES PATENT AND TRADEMARK OFFICE
CERTIFICATE OF CORRECTION

PATENT NO. : 11,346,751 B1
APPLICATION NO. : 17/388519
DATED : May 31, 2022
INVENTOR(S) : Caleb Bridges King et al.

It is certified that error appears in the above-identified patent and that said Letters Patent is hereby corrected as shown below:

In the Specification

Column 37, Line 8-9, delete "$\sigma_{Total}^2=\sigma_1^2+\sigma_2^2+\sigma_{1\times2}^2+\sigma_{Error}^2$" and insert -- $\sigma_{Total}^2 = \sigma_1^2 + \sigma_2^2 + \sigma_{1\times2}^2 + \sigma_{Error}^2$ --, therefor.

Column 37, Line 17, delete "Φ" and insert -- $\beta$ --, therefor.

Column 39, Lines 4-5, delete "$\sigma_{Total}^2=\sigma_{Gauge}^2+\sigma_{Op}^2+\sigma_{Gauge\times Op}^2+\sigma_{Gauge\times Part}^2+\sigma_{Op\times Part}^2+\sigma_{Error}^2$" and insert -- $\sigma_{Total}^2 = \sigma_{Gauge}^2 + \sigma_{Op}^2 + \sigma_{Part}^2 + \sigma_{Gauge \times Op}^2 + \sigma_{Gauge \times Part}^2 + \sigma_{Op \times Part}^2 + \sigma_{Error}^2$ --, therefor.

Column 39, Lines 11-12, delete "$\hat{\sigma}_{Gauge}^2 = MS_{Gauge} - MS_{Gauge\times Op} - MS_{Gauge\times Part} + MS_{Error}$" and insert -- $\hat{\sigma}_{Gauge}^2 = MS_{Gauge} - MS_{Gauge \times Op} - MS_{Gauge \times Part} + MS_{Error}$ --, therefor.

Column 39, Line 43, delete "$bc\sigma_{Op}^2 + c\sigma_{Op*Ga}^2 + \sigma_{Op*Pa}^2 + \sigma_{Op*Ga*Pa}^2 + \sigma_{Error}^2$" and insert -- $bc\sigma_{Op}^2 + c\sigma_{Op*Ga}^2 + b\sigma_{Op*Pa}^2 + \sigma_{Op*Ga*Pa}^2 + \sigma_{Error}^2$ --, therefor.

Signed and Sealed this
Nineteenth Day of August, 2025

Coke Morgan Stewart
*Acting Director of the United States Patent and Trademark Office*